US012710820B2

(12) United States Patent
Kwon et al.

(10) Patent No.: US 12,710,820 B2
(45) Date of Patent: Aug. 18, 2026

(54) ELECTRONIC DEVICE AND METHOD FOR CONTROLLING VIBRATION OUTPUT THEREOF

(71) Applicant: Samsung Electronics Co., Ltd., Suwon-si (KR)

(72) Inventors: Jeongwook Kwon, Suwon-si (KR); Taekyun Kim, Suwon-si (KR); Taeuk Park, Suwon-si (KR); Sangheon Kim, Suwon-si (KR); Hyomin Oh, Suwon-si (KR); Mira Seo, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 18/162,868

(22) Filed: Feb. 1, 2023

(65) Prior Publication Data

US 2023/0176655 A1 Jun. 8, 2023

Related U.S. Application Data

(63) Continuation of application No. PCT/KR2021/010295, filed on Aug. 4, 2021.

(30) Foreign Application Priority Data

Aug. 4, 2020 (KR) ........................ 10-2020-0097622

(51) Int. Cl.
*G06F 3/01* (2006.01)

(52) U.S. Cl.
CPC .................................... *G06F 3/016* (2013.01)

(58) Field of Classification Search
None
See application file for complete search history.

(56) References Cited

U.S. PATENT DOCUMENTS 9,826,342 B2 * 11/2017 Lee ........................ H04B 1/385
10,603,687 B2 * 3/2020 Tanaka .................... G06F 3/016
(Continued)

FOREIGN PATENT DOCUMENTS

CN 108696640 A * 10/2018 ........... H04L 51/224
JP 2002-182688 A2 6/2002
(Continued)

OTHER PUBLICATIONS

Korean Office Action dated May 31, 2025, issued in a Korean Patent Application No. 10-2020-0097622.
(Continued)

*Primary Examiner* — Muhammad Adnan
(74) *Attorney, Agent, or Firm* — Jefferson IP Law, LLP

(57) ABSTRACT

An electronic device is provided. The electronic device includes a display, a communication module, a memory, and a processor, wherein the processor is configured to receive a vibration output request, detect vibration-related situation information, and generate vibration output information corresponding to the detected vibration-related situation information. The vibration-related situation information includes at least one from among information on at least one external electronic device connected to the electronic device, whether a specific application is being executed, and whether a specific function of the electronic device is being executed, and the vibration output information may include at least one from among vibration intensity, a vibration pattern, output device selection information, and priorities in the vibration-related situation information.

15 Claims, 22 Drawing Sheets

| VIBRATION FUNCTION INFORMATION | | | | |
| --- | --- | --- | --- | --- |
| DEVICE | VIBRATION OUTPUT | INTENSITY | PATTERN | IDENTIFIER |
| ELECTRONIC DEVICE | O | 0-5 | O | XXXX-XXXX |
| DEVICE 1 | O | 0-3 | O | aaaa-aaaa |
| DEVICE 2 | X | | X | bbbb-bbbb |
| DEVICE 3 | O | 0-1 | X | cccc-cccc |
| DEVICE 4 | O | 0-5 | 1, 2 | dddd-dddd |

(56) References Cited

U.S. PATENT DOCUMENTS 11,490,223 B2* 11/2022 Kim .................... H04B 1/7163
11,853,541 B2* 12/2023 Yoon .................... G06F 3/04883
11,935,384 B1* 3/2024 Khmelev ........... G08B 21/0453
2005/0140503 A1* 6/2005 Murray .................. B06B 1/162 340/407.1
2009/0322695 A1* 12/2009 Cho .................... G06F 3/04845 345/173
2014/0154986 A1* 6/2014 Lee ......................... H04W 4/80 455/41.2
2014/0333564 A1 11/2014 Hong et al.
2015/0264168 A1* 9/2015 Kawaguchi ........... H04M 19/04 455/418
2015/0317979 A1* 11/2015 Yang ...................... G10L 17/22 704/235
2016/0324487 A1* 11/2016 Guo ..................... A61B 5/0816
2016/0381534 A1* 12/2016 Kwon .................... H04N 23/61 455/556.1
2017/0061754 A1* 3/2017 Kim .................... H04M 19/047
2017/0164832 A1* 6/2017 Kaib .................. A61B 5/02055
2017/0289329 A1* 10/2017 Yim ...................... H04W 88/02
2018/0012074 A1* 1/2018 Holz ...................... G06F 3/011
2018/0225933 A1* 8/2018 Park ...................... H04R 1/025
2019/0155389 A1* 5/2019 Lee ...................... G06F 1/1632
2019/0357021 A1* 11/2019 Kim ...................... G08B 5/228
2020/0099545 A1* 3/2020 Hong ...................... H04L 67/55
2020/0285316 A1* 9/2020 Park ...................... G06F 3/0412
2021/0177519 A1* 6/2021 Crowther ................ G06F 3/016
2021/0186219 A1* 6/2021 Fukuma .................. A47C 7/62
2021/0208684 A1* 7/2021 Eagleman ................ G08B 6/00
2023/0176655 A1* 6/2023 Kwon .................. H04M 1/725 340/407.2
2024/0362983 A1* 10/2024 Kim ........................ G06F 3/016
2025/0328194 A1* 10/2025 Kim .......................... G06F 3/14

FOREIGN PATENT DOCUMENTS

JP 2014-078809 A 5/2014
KR 10-2011-0030223 A 3/2011
KR 10-2014-0074153 A 6/2014
KR 10-2014-0092837 A 7/2014
KR 10-2016-0043426 A 4/2016
KR 10-2016-0136591 A 11/2016
KR 10-2017-0002038 A 1/2017
KR 10-2017-0068340 A 6/2017
KR 10-2017-0081896 A 7/2017
KR 10-2019-0131758 A 11/2019
KR 10-2020-0034376 A 3/2020

OTHER PUBLICATIONS

Korean Decision of Rejection dated Feb. 27, 2026, issued in Korean Patent Application No. 10-2020-0097622.

Korean Notice of Allowance dated Jun. 15, 2026, issued in Korean Patent Application No. 10-2020-0097622.

* cited by examiner

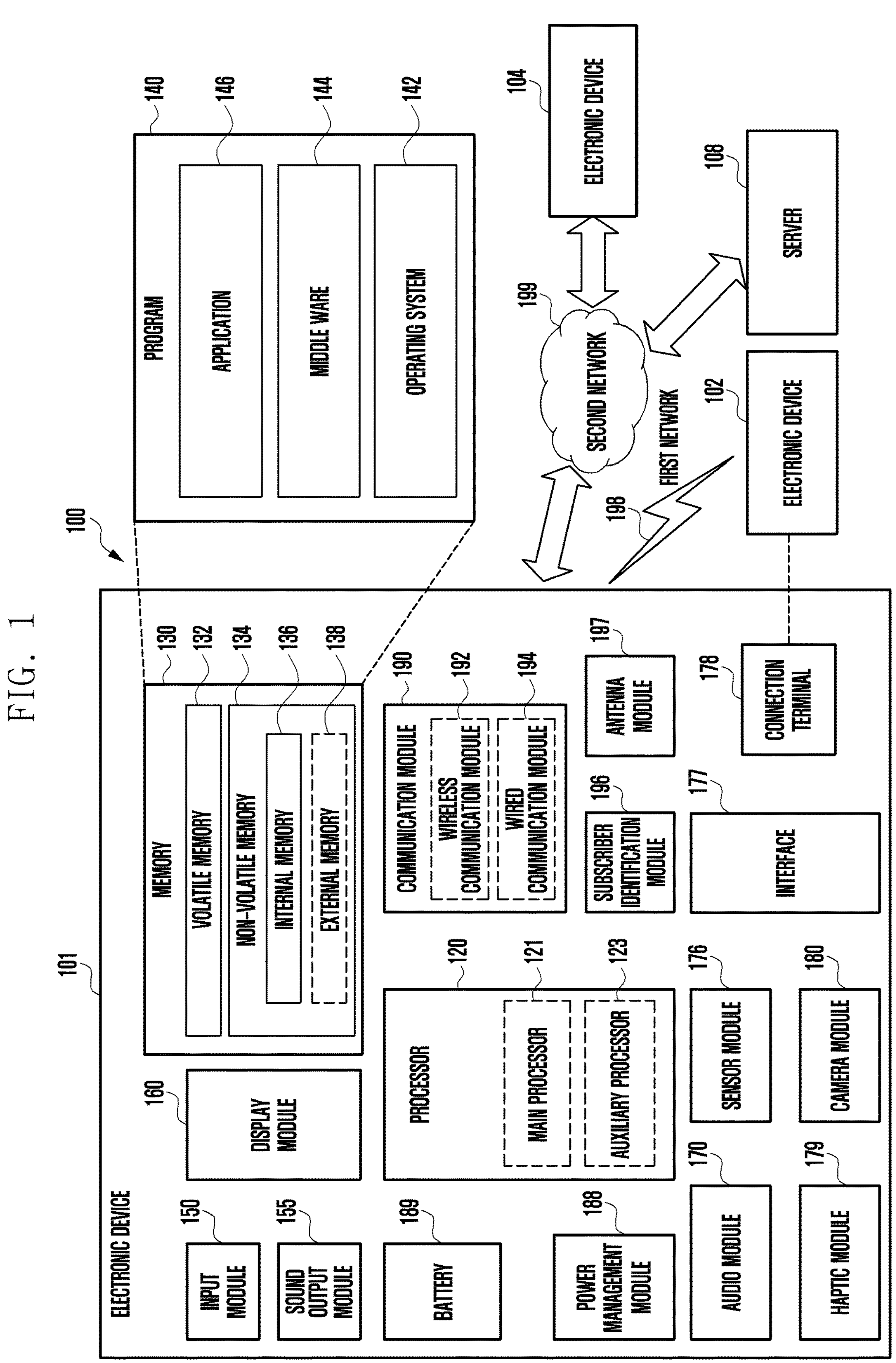
FIG. 1
100
101
ELECTRONIC DEVICE
MEMORY
130
VOLATILE MEMORY
132
NON-VOLATILE MEMORY
134
INTERNAL MEMORY
136
EXTERNAL MEMORY
138
PROGRAM
140
APPLICATION
146
MIDDLE WARE
144
OPERATING SYSTEM
142
INPUT MODULE
150
SOUND OUTPUT MODULE
155
DISPLAY MODULE
160
PROCESSOR
120
MAIN PROCESSOR
121
AUXILIARY PROCESSOR
123
COMMUNICATION MODULE
190
WIRELESS COMMUNICATION MODULE
192
WIRED COMMUNICATION MODULE
194
BATTERY
189
POWER MANAGEMENT MODULE
188
SUBSCRIBER IDENTIFICATION MODULE
196
ANTENNA MODULE
197
AUDIO MODULE
170
SENSOR MODULE
176
INTERFACE
177
CONNECTION TERMINAL
178
HAPTIC MODULE
179
CAMERA MODULE
180
SECOND NETWORK
199
FIRST NETWORK
198
ELECTRONIC DEVICE
104
ELECTRONIC DEVICE
102
SERVER
108

FIG. 3

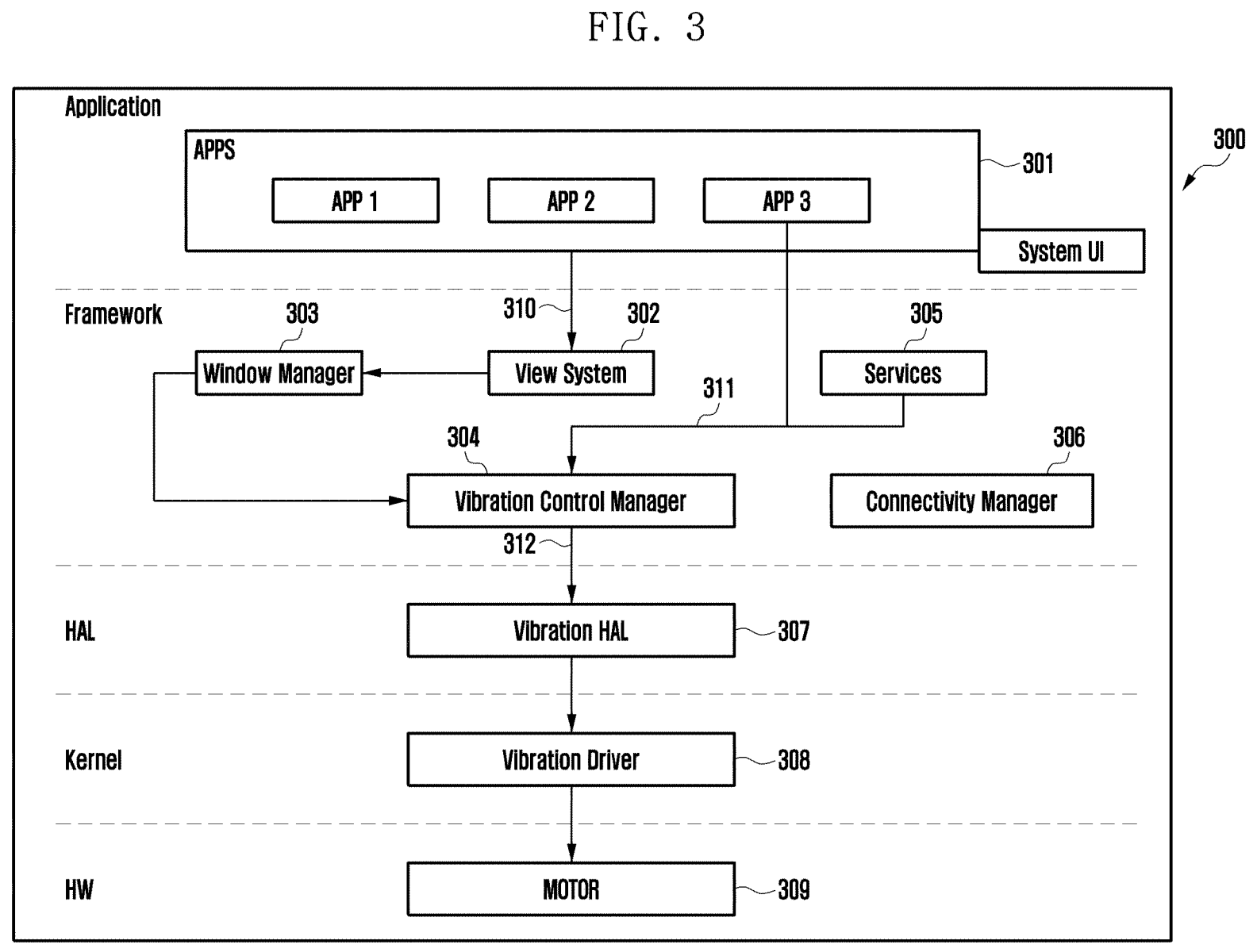

300
Application
APPS
301
APP 1
APP 2
APP 3
System UI
Framework
310
View System
302
Window Manager
303
311
Services
305
Connectivity Manager
306
Vibration Control Manager
304
312
HAL
Vibration HAL
307
Kernel
Vibration Driver
308
HW
MOTOR
309

FIG. 4

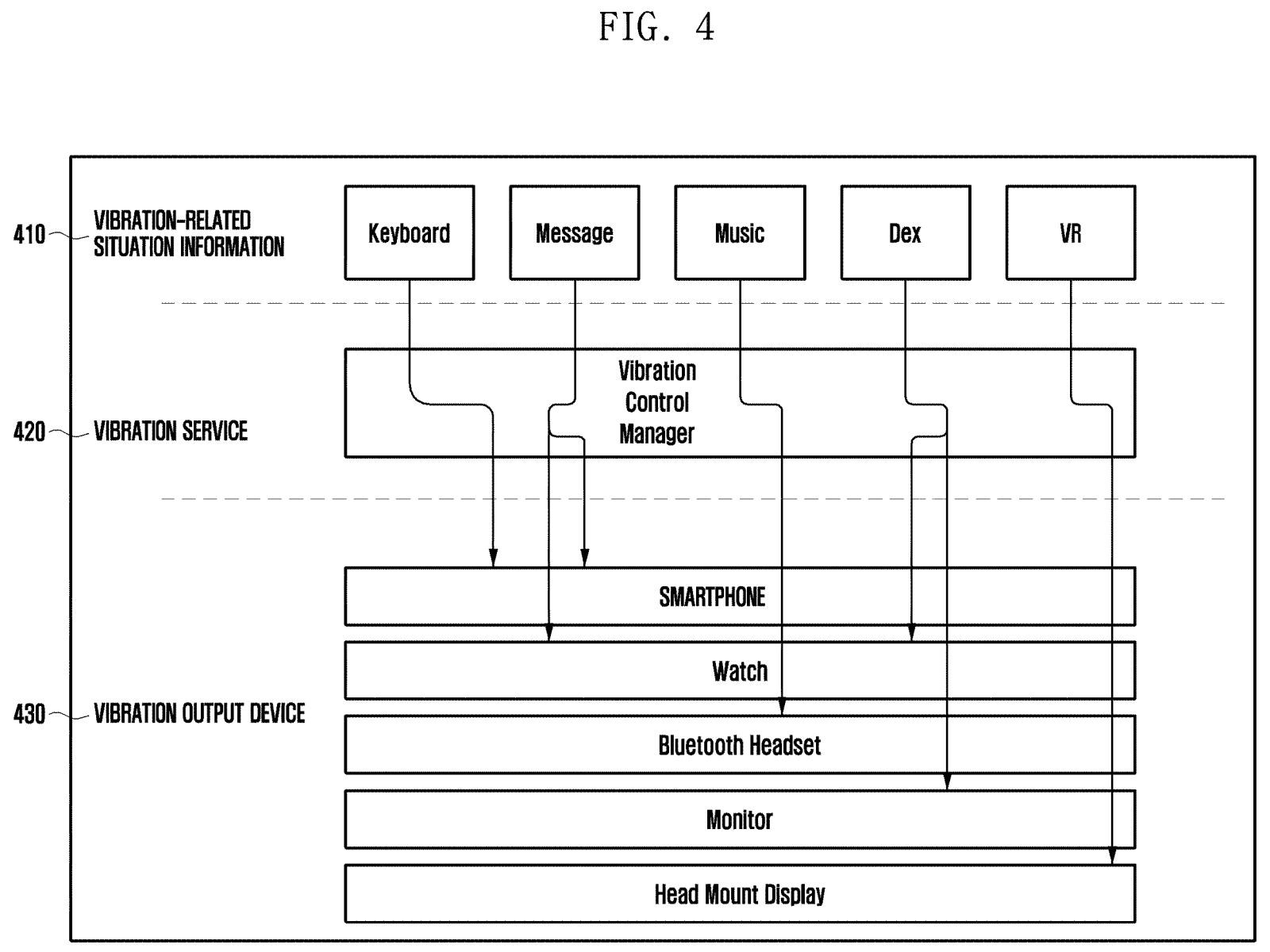

410 VIBRATION-RELATED SITUATION INFORMATION

Keyboard
Message
Music
Dex
VR

420 VIBRATION SERVICE

Vibration Control Manager

430 VIBRATION OUTPUT DEVICE

SMARTPHONE
Watch
Bluetooth Headset
Monitor
Head Mount Display

FIG. 8

| MAPPING INFORMATION | VIBRATION-RELATED SITUATION INFORMATION | | | | VIBRATION OUTPUT INFORMATION | | | |
|---|---|---|---|---|---|---|---|---|
| | EXECUTION FUNCTION | EXTERNAL ELECTRONIC DEVICE | APPLICATION | TYPE | INTENSITY | PATTERN | DEVICE TO PERFORM OUTPUT | PRIORITY ORDER |
| 1 | FUNCTION 1 | - | - | - | 2 | 1 | ELECTRONIC DEVICE | 1 |
| 2 | - | DEVICE 1, DEVICE 2 | - | - | 3 | 3 | DEVICE 1 | 0 |
| 3 | - | DEVICE 3 | APPLICATION 3 | - | 2 | | DEVICE 3 | 1 |
| 4 | - | DEVICE 3 | APPLICATION 2 | - | 1 | 5 | DEVICE 1 | 1 |
| 5 | FUNCTION 1 | - | APPLICATION 1, APPLICATION 2 | - | 2 | 4 | ELECTRONIC DEVICE | 0 |
| 6 | - | - | APPLICATION 4 | 2 | 1 | 1 | DEVICE 1 | 1 |

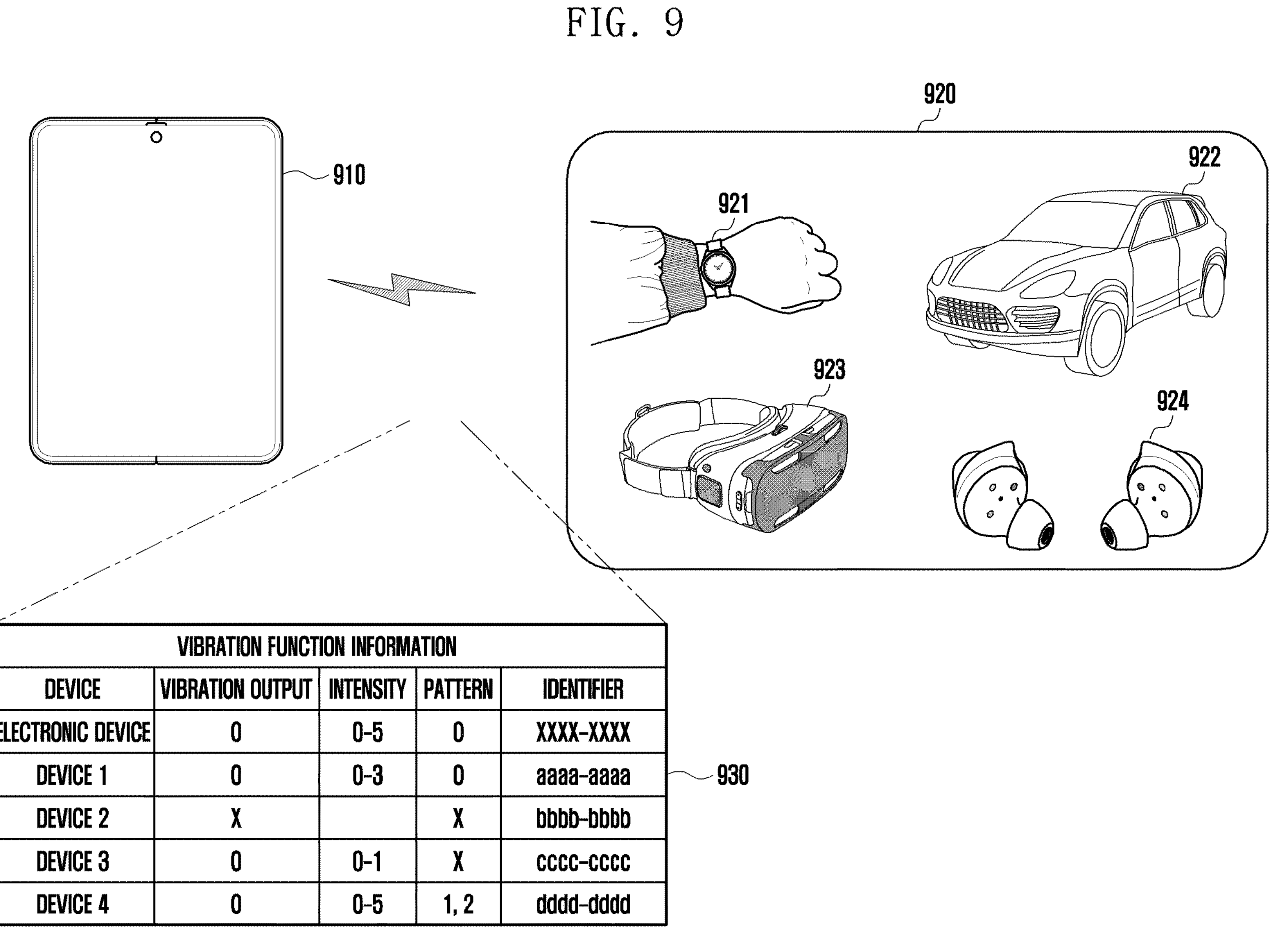
| VIBRATION FUNCTION INFORMATION | | | | |
|---|---|---|---|---|
| DEVICE | VIBRATION OUTPUT | INTENSITY | PATTERN | IDENTIFIER |
| ELECTRONIC DEVICE | 0 | 0-5 | 0 | XXXX-XXXX |
| DEVICE 1 | 0 | 0-3 | 0 | aaaa-aaaa |
| DEVICE 2 | X | | X | bbbb-bbbb |
| DEVICE 3 | 0 | 0-1 | X | cccc-cccc |
| DEVICE 4 | 0 | 0-5 | 1, 2 | dddd-dddd |

Figure 16C:
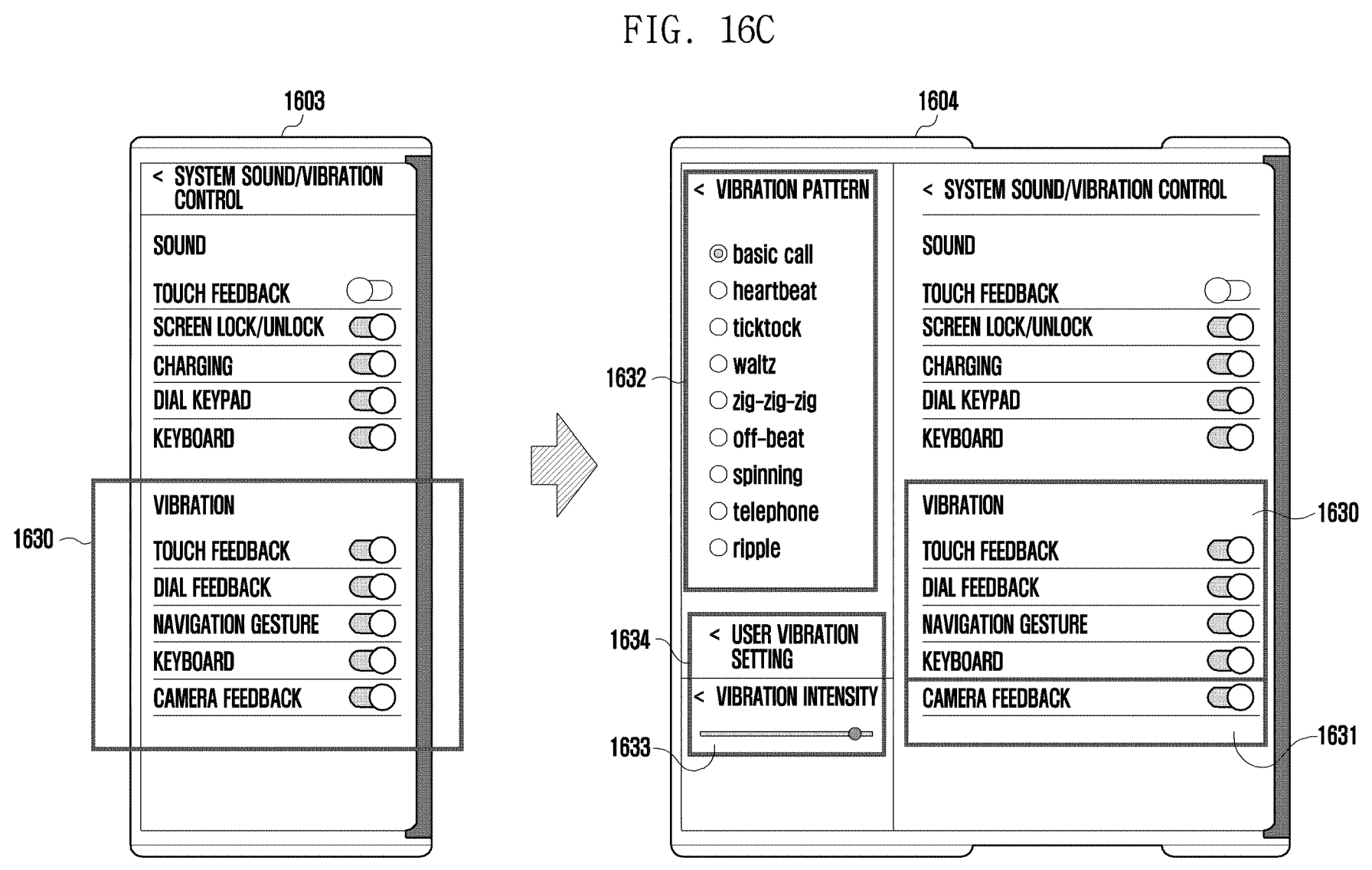

1603
< SYSTEM SOUND/VIBRATION CONTROL
SOUND
TOUCH FEEDBACK
SCREEN LOCK/UNLOCK
CHARGING
DIAL KEYPAD
KEYBOARD
VIBRATION
TOUCH FEEDBACK
DIAL FEEDBACK
NAVIGATION GESTURE
KEYBOARD
CAMERA FEEDBACK
1630

1604
< VIBRATION PATTERN
basic call
heartbeat
ticktock
waltz
zig-zig-zig
off-beat
spinning
telephone
ripple
1632
< USER VIBRATION SETTING
1634
< VIBRATION INTENSITY
1633
< SYSTEM SOUND/VIBRATION CONTROL
SOUND
TOUCH FEEDBACK
SCREEN LOCK/UNLOCK
CHARGING
DIAL KEYPAD
KEYBOARD
VIBRATION
TOUCH FEEDBACK
DIAL FEEDBACK
NAVIGATION GESTURE
KEYBOARD
CAMERA FEEDBACK
1630
1631

ELECTRONIC DEVICE AND METHOD FOR CONTROLLING VIBRATION OUTPUT THEREOF

CROSS-REFERENCE TO RELATED APPLICATION(S)

This application is a continuation application, claiming priority under § 365(c), of an International application No. PCT/KR2021/010295, filed on Aug. 4, 2021, which is based on and claims the benefit of a Korean patent application number 10-2020-0097622, filed on Aug. 4, 2020, in the Korean Intellectual Property Office, the disclosure of each of which is incorporated by reference herein in its entirety.

BACKGROUND

1. Field

The disclosure relates to an electronic device. More particularly, the disclosure relates an electronic device for controlling output of a vibration suitable for each situation.

2. Description of Related Art

Recently, an electronic device provides various types of vibration output. The vibration output includes haptic feedback as a representative example. Via the various types of vibration output, various tactual experiences may be provided to a user.

In addition, a recent electronic device may provide various functions and various connections to various external devices. Recently, wearable electronic devices that are directly worn on bodies have been developed. For example, a wearable electronic device may be provided to be attachable to or detachable from a part of the body or clothes, such as a head-mounted device (HMD), a head-mounted display (HMD), a smart watch, and a smart wristband, and the like.

In association with possibility of connection to various external devices, interest in a usage environment that enables integrative experience of the same function and same content has been increasing.

The above information is presented as background information only to assist with an understanding of the disclosure. No determination has been made, and no assertion is made, as to whether any of the above might be applicable as prior art with regard to the disclosure.

SUMMARY

User requirements for vibration output by an electronic device may be different for each situation. For example, a user may desire to sense an optimal vibration depending on a user's situation or a situation of an electronic device of a user. Therefore, there is a desire for setting vibration output differently for each situation.

As another example, there is a desire for performing control so that an optimal device outputs a vibration appropriate for a current situation of a user of an electronic device in the state in which one or more external devices capable of outputting a vibration are connected to the electronic device.

As another example, in the case that an event for outputting a vibration occurs while a plurality of applications are being executed, there is a desire for vibration output in an appropriate pattern according to an appropriate priority order for each application.

As another example, there is a desire for a vibration effect different for each function or application. In the case that integrative management of vibration output of respective external devices, respective functions, or respective applications is not performed, such as a conventional manner that provides a vibration or a vibration function for limited functions, a user experience may be limited and may become a factor that disturbs a sense of immersion.

Aspects of the disclosure are to address at least the above-mentioned problems and/or disadvantages and to provide at least the advantages described below. Accordingly, an aspect of the disclosure is to provide an electronic device for controlling output of a vibration suitable for each situation.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication module, a memory, and a processor, wherein the processor is configured to receive a vibration output request, to detect vibration-related situation information, and to generate vibration output information corresponding to the detected vibration-related situation information, wherein the vibration-related situation information includes at least one from among information associated with at least one external electronic device connected to the electronic device, whether a predetermined application is executed, and whether a predetermined function of the electronic device is executed, and wherein the vibration output information includes at least one from among a vibration intensity, a vibration pattern, output device selection information, and a priority order of vibration-related situation information.

In accordance with another aspect of the disclosure, a method of controlling vibration output by an electronic device is provided. The method includes an operation of receiving a vibration output request, an operation of detecting vibration-related situation information, and an operation of generating vibration output information corresponding to the detected vibration-related situation information, wherein the vibration-related situation information includes at least one from among information associated with at least one external electronic device connected to the electronic device, whether a predetermined application is executed, and whether a predetermined function of the electronic device is executed, and wherein the vibration output information includes at least one of a vibration intensity, a vibration pattern, output device selection information, and vibration-related situation information.

According to various embodiments, users may experience integrative vibration output in the case that various applications that an electronic device is capable of providing, various functions, or a connection to various external devices are provided. Via the integrative control of vibration output, usability and sense of immersion of users may be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the drawings, in which:

FIG. 1 is a block diagram illustrating an electronic device in a network environment according to an embodiment of the disclosure;

FIG. 3 is a diagram illustrating a hierarchical architecture of an electronic device according to an embodiment of the disclosure;

FIG. 4 is a flowchart illustrating transferring of a vibration control signal according to an embodiment of the disclosure.

FIG. 8 is a table provided as an example of a vibration mapping table according to an embodiment of the disclosure;

FIG. 9 is a diagram illustrating an operation of controlling vibration output in the case that a plurality of external electronic devices are connected according to an embodiment of the disclosure;

FIG. 13 is a diagram illustrating an operation of controlling vibration output in the case that a plurality of external electronic devices are connected according to an embodiment of the disclosure;

FIGS. 16A, 16B, 16C, and 16D are diagrams illustrating vibration control user interfaces according to various embodiments of the disclosure.

Throughout the drawings, it should be noted that like reference numbers are used to depict the same or similar elements, features, and structures.

DETAILED DESCRIPTION

Figure 2:
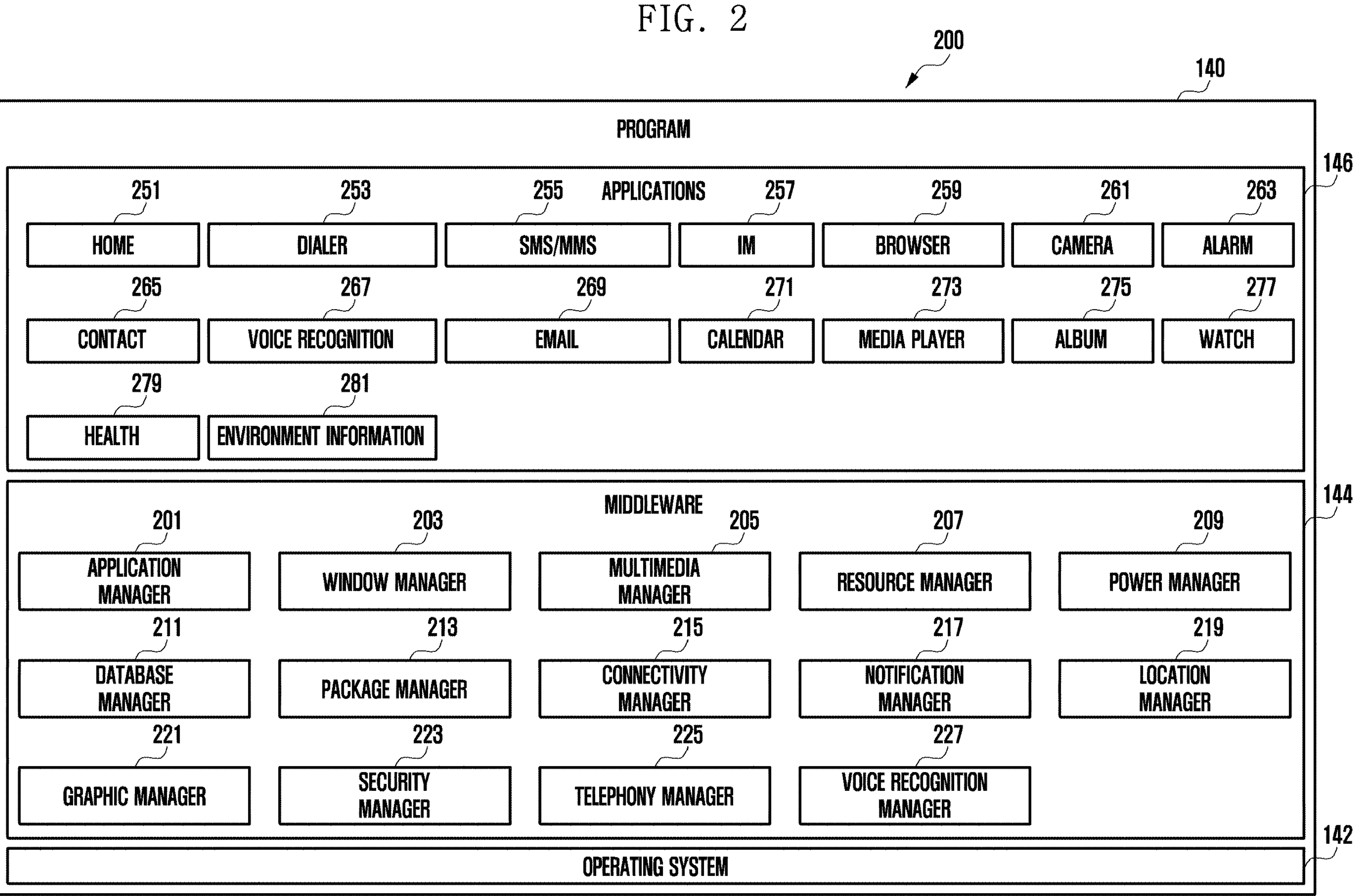
FIG. 2 is a block diagram of a program according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a millimeter wave (mmWave) antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating the program 140 according to an embodiment of the disclosure.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program

140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface (UI) related to the one or more graphic effects. The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

FIG. 3 is a diagram illustrating a hierarchical architecture of an electronic device according to an embodiment of the disclosure.

Figure 5:
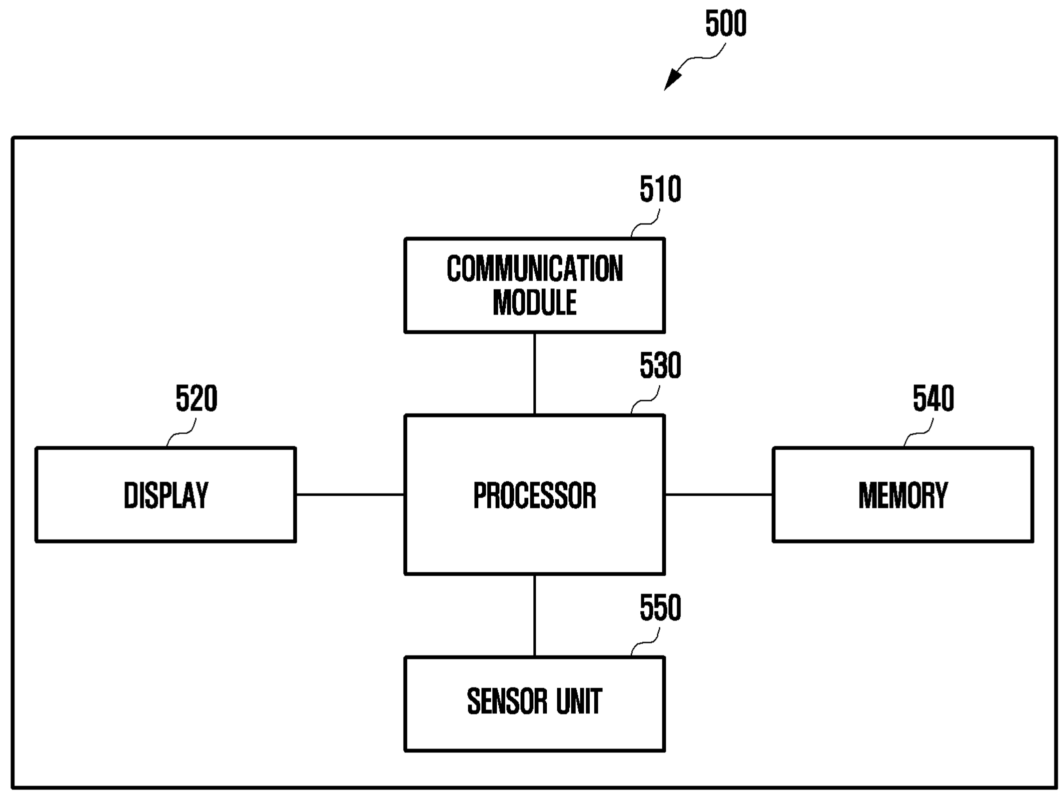
FIG. 5 is a block diagram of an electronic device according to an embodiment of the disclosure.

A hierarchical architecture 300 of an electronic device of FIG. 3 may be an architecture of software of the electronic device (e.g., the electronic device 101 of FIG. 1, an electronic device 500 of FIG. 5). According to various embodiments, at least some of the elements illustrated may be changed depending on a platform included in the electronic device (e.g., the electronic device 101 of FIG. 1, the electronic device 500 of FIG. 5). The hierarchical architecture 300 of the electronic device may include an application layer, a framework layer, a hardware abstraction layer (HAL), a kernel layer, and a hardware layer. The application layer may include at least one application 301 that is stored in a memory (e.g., the memory 130 of FIG. 1, the memory 540 of FIG. 5) and is executable by a processor (e.g., the processor 120 of FIG. 1, the processor 530 of FIG. 5). The application 301 may include at least a part of the configuration and/or functions of the application 146 of FIG. 2. The application may draw at least one layer based on a resolution of a display area of a display. The application 301 according to various embodiments may draw a layer based on the resolution of a display area of a display using a drawing library (e.g., a view system). A system UI may be an application that configures various graphical user interface (GUI) screens embodied in a system of an electronic device such as a notification bar, a quick view, or the like. The framework layer may include a view system 302, a window manager 303, a vibration control manager 304, services 305, and a connectivity manager 306. The view system 302 may be a program for drawing at least one layer based on a resolution of a display area of a display. For example, the view system 302 may provide a drawing library used when the application 301 draws a layer. The window manager 303 may manage GUI resources used for a screen. In the case that a change in the state of an electronic device is identified via a sensor module, the window manager 303 may transfer, to the application 301, information associated with a display area corresponding to the changed state of the electronic device. For example, in the case that a change in the state of the electronic device is identified, the window manager 303 may transfer information of a display area corresponding to the changed state to an application to which continuity is set among applications 301 being executed. The vibration control manager 304 may determine a device that is to output a vibration, and may determine the type of a module that requests vibration output and/or a priority thereof. The services 305 may control and manage various services that the electronic device provides. For example, the service 305 may provide a function of informing a user of events that occur in association with various services. The connectivity manager 306 may manage a wireless connection or a wired connection between the electronic device and an external electronic device. The hardware abstraction layer may include a vibration hardware abstraction layer (vibration HAL) 307. The vibration hardware abstraction layer may be an abstracted layer between the electronic device software and a hardware module included in a hardware layer. The kernel layer may include a vibration driver 308. For example, the vibration driver 308 may control a hardware module in the hardware layer. The hardware layer may include a vibration motor 309. For example, the vibration motor 309 may output a vibration based on control performed by the vibration driver 308.

Referring to FIG. 3, the electronic device may control vibration output using a vibration output request signal 310 and 311 and a vibration output control signal 312. Vibration output may be controlled by the vibration control manager 304. The flow of the vibration request signal 310 may be transferred from the application 301 to the view system 302, and the view system 302 may transmit the vibration request signal 310 to the vibration control manager 304 via the window manager 303. According to various embodiments, the application 301 or the services 305 may directly transmit the vibration request signal 311 to the vibration control manager 304. When receiving the vibration request signal 311, the vibration control manager 304 that receives the vibration request may determine vibration output information including a vibration intensity and pattern in response to a corresponding vibration call signal. The vibration control manager 304 that determines the vibration output information may transmit a vibration control signal and output a vibration via the vibration hardware abstraction layer 307, the vibration driver 308, and the vibration motor 309, and also, the vibration control manager 304 may transmit a vibration control signal to the connectivity manager 306 so that an external electronic device outputs a vibration. The hierarchical architecture 300 of the electronic device of FIG. 3 and the elements included in the hierarchical architecture 300 of the electronic device may be stored in a memory (e.g., a memory 540 of FIG. 5) of the electronic device. A processor (e.g., a processor 530 of FIG. 5) of the electronic device may be connected to a memory, and may control at least one component element of the electronic device including the memory. Therefore, a detailed operation of controlling vibration output described below will be provided with reference to operation of a processor.

FIG. 4 is a flowchart illustrating transferring of a vibration control signal according to an embodiment of the disclosure.

Referring to FIG. 4, control of vibration may be performed via signal transferring among a plurality of pieces of vibration-related situation information 410, a vibration control manager 420, and at least one vibration output device 430. Vibration-related situation information may be an element that needs vibration output. For example, vibration-related situation information may be a predetermined event, a predetermined state, and/or a predetermined situation. According to various embodiments, vibration-related situation information may be functions provided by an application, an external electronic device, and an electronic device. According to various embodiments, vibration-related situation information may include at least one from among whether at least one predetermined application executed by an electronic device is performed, whether a predetermined function provided by at least one application is executed, whether at least one external electronic device is connected to the electronic device, whether at least one function of a connected predetermined external electronic device is executed, and whether at least one function provided by the electronic device is executed, or a combination thereof. According to various embodiments, vibration-related situation information may include at least one from among a physical form of an electronic device, a posture of the electronic device, and a surrounding environment, or a combination thereof. According to an embodiment, vibration-related situation information may be a change in the form of an electronic device, and a processor of the electronic device may detect the change in the form and may determine a predetermined form or the state of the change in the form as the vibration-related situation information. According to another embodiment, vibration-related situation information may be a posture (e.g., an angle) of an electronic device, and a processor of the electronic device may receive posture information of the electronic device via a sensor that senses a posture of the electronic device, and may determine a predetermined posture (e.g., the state of being inclined at 45 degrees from the ground) as the vibration-related situation information. According to another embodiment, a surrounding environment (e.g., weather, illuminance, humidity, temperature, and a distance to an external electronic device) of an electronic device may be sensed, information associated with an external environment may be received via a predetermined application, and a predetermined surrounding environment may be determined and detected as vibration-related situation information. According to various embodiments, vibration-related situation information may be a context value (e.g., a sensor value, a condition) associated with a predetermined event. For example, a context value may be recognized in association with a predetermined situation such as the case in which a user rides a vehicle, the case in which a user arrives home, the case in which a user goes to work, and the case in which a user gets sleep, and the corresponding information may be determined as the vibration-related situation information.

According to various embodiments, vibration-related situation information may be a change (e.g., 60 Hz, 120 Hz) in the refresh rate of a display.

Referring to FIG. 4, for example, vibration-related situation information may be a predetermined function of a message application. The vibration control manager 420 may identify vibration output information corresponding to vibration-related situation information. For example, the vibration control manager 420 may read previously stored information associated with mapping between vibration-related situation information and vibration output information. According to an embodiment, the vibration control manager 420 may generate vibration output information corresponding to vibration-related situation information based on mapping information, for example, a vibration mapping table, and may transmit a signal for controlling vibration output. In the case that a predetermined function that requires vibration output of a message application is performed, a vibration request signal may be transmitted to the vibration control manager 420. The vibration control manager 420 that receives a vibration request may transmit a signal for controlling vibration output to the vibration output device 430.

Referring to FIG. 4, in the case that a vibration request is received from a message among vibration-related situation information, the vibration control manager 420 may transmit a signal for controlling vibration output to both a smartphone that is an electronic device and a watch that is an external electronic device connected to the smartphone. Although a vibration output control operation has been described with reference to FIG. 4, the vibration output control operation is not limited to the above-described example. In addition to the example of FIG. 4, any vibration output control operation that complies with the concept of the vibration-related situation information 410, the vibration control manager 420, and the vibration output device 430 may be included without restriction.

FIG. 5 is a block diagram of an electronic device 500 according to an embodiment of the disclosure.

Referring to FIG. 5, the electronic device 500 (e.g., the electronic device 101 of FIG. 1) may include a communication module 510 (e.g., the communication module 190 of FIG. 1), a display 520 (e.g., the display module 160 and the input module 150 of FIG. 1), a processor 530 (e.g., the processor 120 of FIG. 1), a memory 540 (e.g., the memory 130 of FIG. 1), and a sensor unit 550 (e.g., the sensor module 176 of FIG. 1). The electronic device 500 may include at least a part of the configuration and/or functions of the electronic device 101 of FIG. 1.

The communication module 510 may perform connection to an external electronic device via a network. For example, the communication module 510 may support various short-range wireless communication schemes (e.g., Bluetooth, Bluetooth low energy (BLE), and Wi-Fi), and may include an independent hardware and/or software configuration to support each wireless communication scheme. According to an embodiment, a part of the configuration (e.g., the communication processor 350) of the communication module 510 may be included in the processor 530. The communication module 510 may include at least a part of the configuration and/or functions of the communication module 190 of FIG. 1. According to various embodiments, the electronic device 500 may perform connection between at least one external electronic device and the electronic device using the communication module 510.

The display 520 may visually provide information to the outside of the electronic device 500. According to various embodiments, the display 520 may include a touch screen that senses a touch input or a hovering input. The display 520 may include at least a part of the configuration and/or functions of the display module 160 of FIG. 1, and may include at least a part of the configuration and/or functions of the input module 150 of FIG. 1. The display 520 of the electronic device 500 may include a structure provided in a modifiable form. The electronic device 500 may include a structure in which the prepared display 520 is foldable, and is not limited to any scheme. For example, in association with a folding scheme, the electronic device 500 may be folded inward, or may be folded outward. According to various embodiments, the electronic device 500 may include a structure in which the prepared display 520 is rolled (rolling) (e.g., sliding), and is not limited to any scheme. For example, a partial area of the display 520 of the electronic device 500 may be rolled inward to be accommodated in a housing or may be folded, or may be unfolded right and left or up and down using at least one roller structure or the like. A change in the form of the electronic device 500 may be, for example, the state in which the display 520 of the electronic device is formed.

The memory 540 is to temporarily or permanently store undefined digital data, and may include at least one of the configuration and/or functions of the memory 130 of FIG. 1. The memory may include non-volatile memory such as one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD), and volatile memory such as dynamic RAM (DRAM), static RAM (SRAM), or synchronous dynamic RAM (SDRAM). The memory 540 may store various instructions executable in the processor 530. Such instructions may include various control commands, such as an arithmetic and logic operation, data transferring, and input and output, which may be recognized by the processor 530. According to various embodiments, the hierarchical architecture 300 of the electronic device of FIG. 3 and all or some of the elements thereof may be stored in the memory 540. In addition, data needed for vibration control performed by the processor 530 and result data obtained by performing vibration control may be stored in the memory 540. For example, an instruction related to vibration control and stored in the memory 540 may be performed by the processor 530.

The electronic device 500 may detect a movement and a surrounding environment of the electronic device 500 using a sensing value obtained from the sensor unit 550. For example, the sensor unit 550 may include various sensors for sensing a movement of the electronic device 500 such as an acceleration sensor (not illustrated), a gyro sensor (not illustrated), and the like. According to various embodiment, the sensor unit 550 may include various sensors such as a temperature sensor (not illustrated) and a photosensitive sensor (not illustrated) for sensing a surrounding environment of the electronic device 500. According to various embodiments, the sensor unit 550 may include a sensor (a folding-sensing sensor (not illustrated), a rolling-sensing sensor (not illustrated), a sliding-sensing sensor (not illustrated)) to sense a change in the form of the electronic device 500 (e.g., folding state, rolling state, a sliding state). The sensor unit 550 may perform a function of sensing a change of the form of the electronic device 500, for example, a folding state including a folding angle of the display, and may include a gyro sensor (not illustrated), a magnetic force sensor (not illustrated), an acceleration sensor (not illustrated), and the like. In addition, the folding-sensing sensor (not illustrated) may be located in one side of the housing of the electronic device or may be disposed in a hinge.

The processor 530 may be an element capable of performing an operation and data processing associated with control and/or communication of each element of the electronic device 500, and may include at least a part of the configuration and/or functions of the processor 120 of FIG. 1. The processor 530 may be operatively, functionally, and/or electrically connected to each element of the electronic device 500 including the communication module 510, the display 520, the memory 540, and a sensor.

According to various embodiments, although an operation and data processing function that the processor 530 is capable of implementing in the electronic device 500 may not be limited, the document will describe various embodiments of performing a function of configuring vibration-related situation information based on an application executed by the electronic device 500, an external electronic device connected to the electronic device 500, and a function performed by the electronic device 500, a function of mapping the same to vibration output information, and a function of outputting a vibration. Such operations of the processor 530 may be performed by loading instructions stored in the memory 540.

According to various embodiments, the processor 530 may execute applications, programs, and software stored in the memory 540. Applications, programs, and software executable in the electronic device 500 are not defined, and for example, the processor 530 may execute vibration control software stored in the memory 540 and may perform the configuration and/or functions of a vibration control system.

According to various embodiments, the processor 530 may identify vibration-related situation information of the electronic device 500. The vibration-related situation information may be an element that needs vibration output. For example, vibration-related situation information may be a predetermined event, a predetermined state, and/or a predetermined situation. According to various embodiments, vibration-related situation information may be functions provided by an application, an external electronic device, and an electronic device. According to various embodiments, vibration-related situation information may include at least one from among whether at least one predetermined application executed by an electronic device is performed, whether a predetermined function provided by at least one application is executed, whether at least one external electronic device is connected to the electronic device, whether at least one function of a connected predetermined external electronic device is executed, and whether at least one function provided by the electronic device is executed, or a combination thereof. According to various embodiments, the vibration-related situation information may include at least one of a physical form of an electronic device, a posture of an electronic device, and a surrounding environment, or a combination thereof. According to an embodiment, information associated with vibration-related situation information may be information stored in advance in the memory 540. The information associated with vibration-related situation information according to various embodiments may be received via user input. The information associated with the vibration-related situation information according to various embodiments may be determined by the processor 530.

According to various embodiments, the processor 530 may perform mapping between vibration output information and vibration-related situation information. Vibration output information may be an element that may be output as a vibration. For example, the vibration output information may include a vibration intensity, a vibration pattern, and a device that is to output a vibration. According to various embodiments, a vibration may be haptic feedback. For example, haptic feedback output information may include a vibration intensity, a vibration pattern, and a device that is to output a vibration. According to various embodiments, vibration output information may include a priority order of vibration-related situation information. The processor 530 may identify vibration-related situation information, and may produce a vibration mapping table including vibration mapping information obtained by mapping the vibration-related situation information and the vibration output information. According to various embodiments, the processor 530 may perform mapping between a plurality of pieces of vibration-related situation information and a plurality of pieces of vibration output information, as a single vibration mapping table.

According to various embodiments, the processor 530 may store, in the memory 540, a vibration mapping table including vibration-related situation information and vibration output information which are mapped to each other. For example, the vibration mapping table may be stored in a database (not illustrated) included in the memory 540. The processor 530 may output a vibration based on the vibration mapping table stored in the memory 540. According to various embodiments, based on the vibration mapping table, the processor 530 may transmit a signal indicating output of a vibration to at least one external electronic device connected to the electronic device 500 via the communication module 510.

According to various embodiments, the processor 530 may receive vibration function information from at least one external electronic device. The processor 530 may control connection between the electronic device 500 and an external electronic device via the communication module 510, and may receive, from the connected external electronic device, information of the corresponding device. Vibration function information may be information associated with at least one piece of vibration output information that a predetermined external electronic device is capable of providing. For example, a vibration intensity and a vibration pattern that a predetermined external electronic device is capable of providing may be included. According to various embodiments, each of a vibration intensity or a vibration pattern may be digitized information, and may be the range of vibration intensity or the range of a vibration pattern that a corresponding predetermined external electronic device is capable of providing. For example, the vibration intensity may be expressed by digitizing the frequency and/or amplitude of a vibration output. For example, the vibration pattern may be understood as outputting a vibration output and stopped in a predetermined pattern, or outputting a combination of vibrations output at various intensities. According to various embodiments, an electronic device and/or an external electronic device may store a vibration pattern in advance, and may receive and store a new vibration pattern. According to various embodiments, vibration function information may be read from identification information of a corresponding predetermined external electronic device. For example, the processor 530 may retrieve vibration function information stored in advance in the memory 540, and may identify vibration function information corresponding to identification information received from a connected external electronic device. Vibration function information may be different depending on the type of a vibration module or the type of a vibration motor included in an external electronic device. According to various embodiments, vibration function information may be information associated with a function that is supported by a predetermined external electronic device, and is for providing vibration output. For example, in the case of an external electronic device that does not provide vibration output, vibration function information may be information associated with whether vibration output is provided. According to various embodiments, vibration function information may be a signal, an event, and/or an instruction that causes a predetermined external electronic device to output a vibration.

According to various embodiments, based on vibration function information, the processor 530 may perform mapping between vibration-related situation information and vibration output information. For example, the processor 530 may determine vibration output information based on received vibration function information. According to various embodiments, the processor 530 may determine vibration output information in consideration of the range of an intensity of a vibration capable of being output and the range of a pattern of a vibration capable of being output, which are included in the vibration function information of a predetermined external electronic device. According to various embodiments, a part of the vibration-related situation information may be based on information included in vibration function information.

Figure 6:
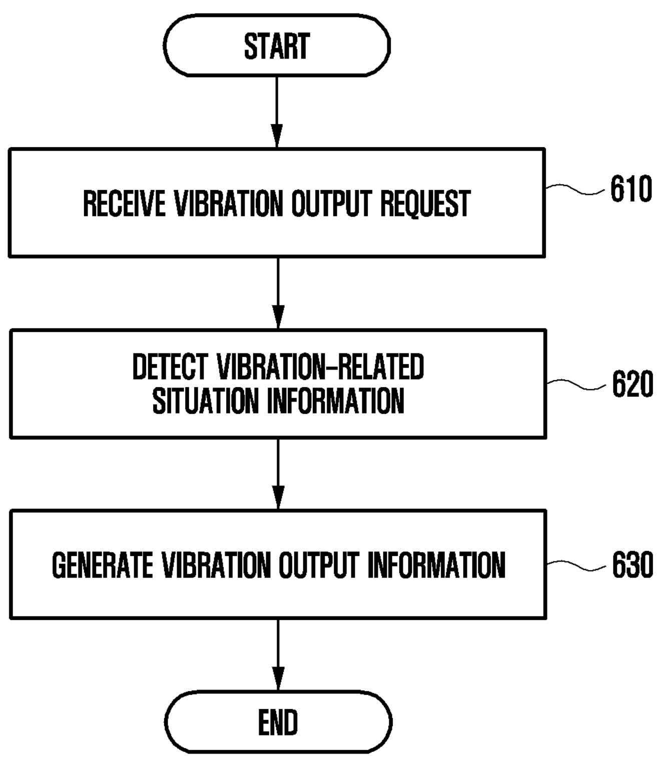
FIG. 6 is a flowchart illustrating an operation of controlling vibration output of an electronic device according to an embodiment of the disclosure.

FIG. 6 is a flowchart illustrating an operation of controlling vibration output of an electronic device according to an embodiment of the disclosure.

Referring to FIG. 6, in operation 610, the electronic device may receive a vibration output request. In operation 620, the processor 530 of the electronic device 500 may detect vibration-related situation information. According to various embodiments, the vibration-related situation information may be functions provided by an application, an external electronic device, and an electronic device. According to various embodiments, the vibration-related situation information may include at least one from among whether at least one predetermined application executed by an electronic device is performed, whether a predetermined function provided by at least one application is executed, whether at least one external electronic device is connected to the electronic device, whether at least one function of a connected predetermined external electronic device is executed, and whether at least one function provided by the electronic device is executed, or a combination thereof. According to various embodiments, the vibration-related situation information may include at least one of a physical form of an electronic device, a posture of an electronic device, and a surrounding environment, or a combination thereof. According to an embodiment, information associated with the vibration-related situation information may be information stored in advance in the memory 540. The vibration-related situation information according to various embodiments may be received via user input.

In operation 630, the processor 530 may identify vibration output information based on the detected vibration-related situation information. The vibration output information may be an element that may be output as a vibration. For example, the vibration output information may include a vibration intensity, a vibration pattern, and a device that is to output a vibration. According to various embodiments, the vibration output information may include a priority order of vibration-related situation information. According to various embodiments, the vibration output information may be information mapped to the vibration-related situation information. For example, the vibration output information and the vibration-related situation information are mapped to each other so that mapping information, for example, a mapping table may be configured. According to various embodiments, the processor 530 may perform mapping between a plurality of pieces of vibration-related situation information and a plurality of pieces of vibration output information, as a single vibration mapping table, and may store the same in the memory 540. Based on the vibration mapping table, the processor 530 may identify vibration output information corresponding to vibration-related situation information. According to various embodiments, the processor 530 may select optimal vibration output information corresponding to vibration-related situation information without a mapping table stored in advance. According to various embodiments, the processor 530 may update a mapping table by adding vibration-related situation information and vibration output information. For example, mapping information may be added to the mapping table by receiving user input. According to various embodiments, the processor 530 may output a vibration based on a vibration mapping table stored in the memory 540. For example, based on the vibration mapping table, the processor 530 may transmit a signal indicating output of a vibration to at least one external electronic device connected to the electronic device 500 via the communication module 510.

Figure 7:
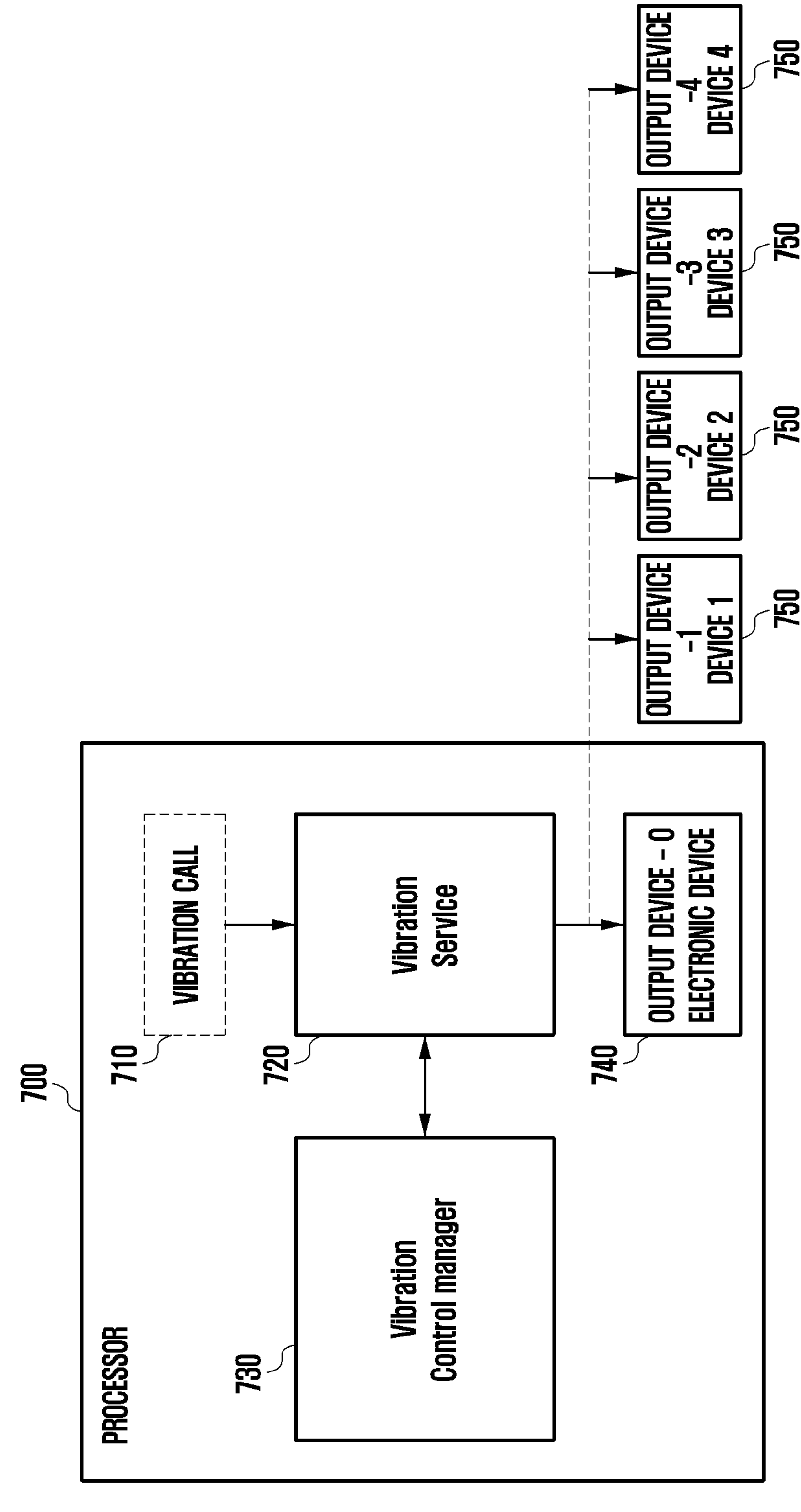
FIG. 7 is a schematic diagram of a vibration control system according to an embodiment of the disclosure.

FIG. 7 is schematic diagram of a vibration control system according to an embodiment of the disclosure.

Referring to FIG. 7, a processor 700 may include a vibration call 710, a vibration service 720, a vibration control manager 730, and vibration output devices 740 and 750.

According to various embodiments, the processor 700 may be understood based on an operation of the processor 503 that reads a vibration control instruction stored in the memory 540. According to various embodiments, the vibration call 710 may transmit a signal for requesting vibration output to the vibration service 720. The vibration call 710 may be vibration-related situation information. According to various embodiments, the vibration call 710 may be a signal transmitted from vibration-related situation information. According to various embodiments, the vibration service 720 may include at least a part of the configuration and/or functions of the service 305 of FIG. 3. The vibration service 720 may transmit, to the vibration control manager 730, a vibration request signal received from the vibration call 710. The vibration control manager 730 may identify a vibration mapping table, and may determine vibration output based on the received vibration request signal and the vibration mapping table. According to various embodiments, the vibration mapping table may be mapping information associated with mapping between vibration-related situation information and vibration output information, and may be data stored in advance in the memory 540. According to various embodiments, the vibration control manager 730 may transmit, to each vibration output device 740 and 750 to perform output, a signal and/or instruction associated with vibration output determined based on the vibration mapping table. For example, the vibration output may be performed in a manner in which the vibration control manager 730 transmits a vibration output signal to the vibration service 720, and the vibration service 720 transmits the same to each vibration output device 740 and 750. The vibration output device 740 may be a vibration output module of the electronic device 500. According to various embodiments, the vibration output device 750 may be an external electronic device.

FIG. 8 is a table provided as an example of a vibration mapping table according to an embodiment of the disclosure.

To perform vibration output control, a data table including mapping information associated with mapping between vibration-related situation information and vibration output information may be prepared. For example, a vibration mapping table such as the example of FIG. 8 may be prepared. The vibration mapping table may be mapping information associated with mapping between vibration-related situation information and a vibration output element, and/or a combination thereof. According to various embodiments, vibration-related situation information may be a predetermined event, a predetermined state, and/or a predetermined situation that requires vibration output. According to various embodiments, vibration-related situation information may be functions provided by an application, an external electronic device, and an electronic device. According to various embodiments, vibration-related situation information may include at least one from among whether at least one predetermined application executed by an electronic device is performed, whether a predetermined function provided by at least one application is executed, whether at least one external electronic device is connected to the electronic device, whether at least one function of a connected predetermined external electronic device is executed, and whether at least one function provided by the electronic device is executed, or a combination thereof.

Referring to FIG. 8, vibration output information may include a function executed by an electronic device, an external electronic device, an application, and the form of an electronic device, but the type of vibration output information is not limited to the above-described example. The vibration output information may be an element that may be output as a vibration. For example, the vibration output information may include a vibration intensity, a vibration pattern, and a device that is to output a vibration. According to various embodiments, the vibration output information may include a priority order of vibration-related situation information.

Referring to FIG. 8, the vibration output information may include a vibration intensity, a vibration pattern, a device to output a vibration, and a priority order of vibration-related situation information, but the type of vibration output information is not limited to the above-described example.

Referring to FIG. 8, the vibration mapping table may include a combination of at least one piece of vibration-related situation information and at least one piece of vibration output information. For example, the vibration-related situation information may include whether device 3 is connected among external electronic devices and whether application 3 is executed among applications. In this instance, the vibration output information may include information that determines that a vibration intensity is 2, a vibration output device is device 3, and the priority order of corresponding vibration-related situation information is 1. For example, in the case that application 3 is executed while device 3 is connected among the external electronic devices, vibration output may be information indicating that device 3 is to output a vibration of intensity 2 with a priority order of 1.

FIG. 9 is a diagram illustrating an operation of controlling vibration output in the case that a plurality of external electronic devices are connected according to an embodiment of the disclosure.

Referring to FIG. 9, an electronic device 910 may be connected to various external electronic devices. According to various embodiments, the electronic device 910 may connect to an external electronic device 920 using short-range wireless communication (e.g., Bluetooth, BLE, Wi-Fi) performed via a communication module. For example, connection may be performed to each of a plurality of external electronic devices such as a first external electronic device 921, a second external electronic device 922, a third external electronic device 923, and a fourth external electronic device 924, and the connection to the plurality of external electronic devices may be performed simultaneously.

According to various embodiments, in the case of performing connection to an external electronic device, the electronic device 910 may receive vibration function information of the external electronic device. The vibration function information may be information associated with at least one piece of vibration output information that a predetermined external electronic device is capable of providing. For example, a vibration intensity and a vibration pattern that a predetermined external electronic device is capable of providing may be included. According to various embodiments, each of a vibration intensity or a vibration pattern may be digitized information, and may be the range of vibration intensity or the range of a vibration pattern that a corresponding predetermined external electronic device is capable of providing. According to various embodiments, vibration function information 930 may be read from identification information of a corresponding predetermined external electronic device.

Referring to FIG. 9, vibration function information 930 may include the type of a vibration output device, whether a vibration is capable of being output, the range of a vibration intensity, the range of a vibration pattern, and an identifier of a corresponding external electronic device. For example, in the case that the electronic device 910 is connected to the fourth electronic device 924, the electronic device 910 may receive, as vibration function information, information indicating that the fourth external electronic device 924 is capable of outputting a vibration, a vibration intensity may be supportable in the range of 0 to 5, and pattern 1 and pattern 2 may be capable of being output as a vibration pattern, and identification information of the fourth external electronic device.

Figure 10:
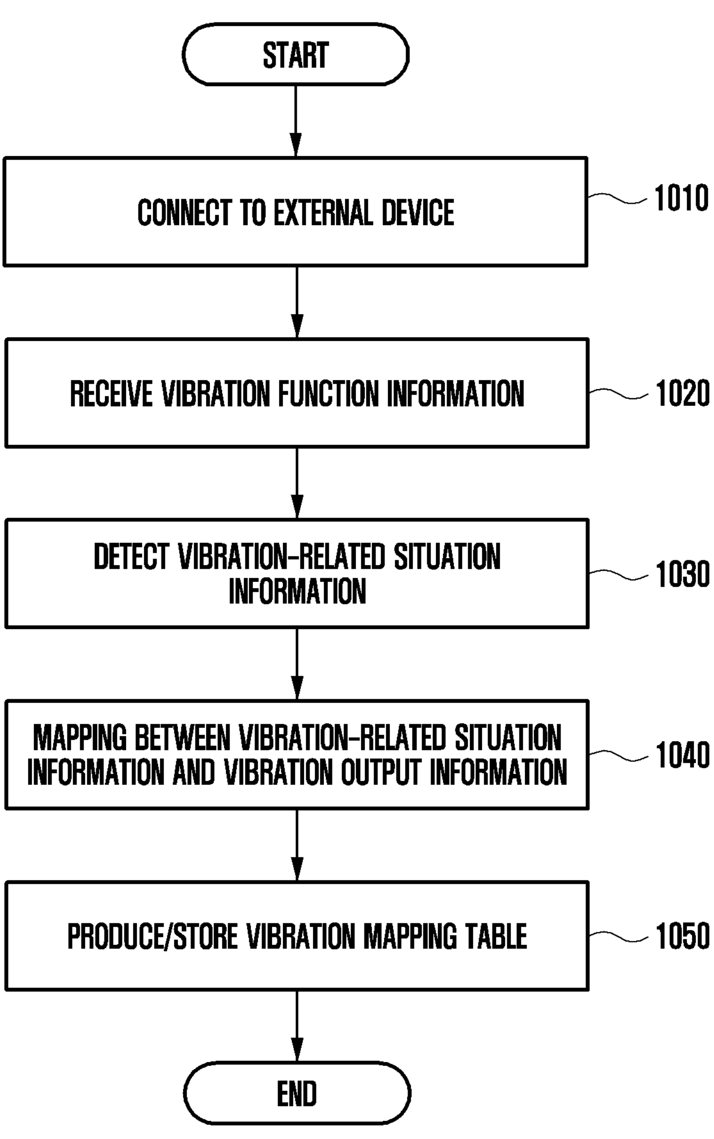
FIG. 10 is a flowchart illustrating an operation of producing a vibration mapping table according to an embodiment of the disclosure.

FIG. 10 is a flowchart illustrating an operation of controlling vibration output in the case that an external electronic device is connected according to an embodiment of the disclosure.

Referring to FIG. 10, in operation 1010, the processor 530 may perform connection to an external electronic device. According to various embodiments, the processor 530 may connect to the external electronic device via the communication module 510, may transmit a signal for controlling the external electronic device, and may receive a signal transmitted from the external electronic device. According to various embodiments, connection to the external electronic device may be performed using short-range wireless communication (e.g., Bluetooth, BLE, Wi-Fi).

In operation 1020, the processor 530 may receive vibration function information from the external electronic device. Vibration function information may be information associated with at least one piece of vibration output information that a predetermined external electronic device is capable of providing. For example, a vibration intensity and a vibration pattern that a predetermined external electronic device is capable of providing may be included. According to various embodiments, each of a vibration intensity or a vibration pattern may be digitized information, and may be the range of vibration intensity or the range of a vibration pattern that a corresponding predetermined external electronic device is capable of providing. According to various embodiments, vibration function information may be read from identification information of a corresponding predetermined external electronic device. For example, the processor 530 may retrieve vibration function information stored in advance in the memory 540, and may identify vibration function information corresponding to identification information received from a connected external electronic device. Vibration function information may be different depending on the type of a vibration module or the type of a vibration motor included in an external electronic device. According to various embodiments, vibration function information may be information associated with a function that is supported by a predetermined external electronic device, and is for providing vibration output. For example, in the case of an external electronic device that does not provide vibration output, the vibration function information may be information associated with whether vibration output is provided. According to various embodiments, vibration function information may be a signal, an event, and/or an instruction that causes a predetermined external electronic device to output a vibration.

In operation 1030, the processor 530 may identify vibration-related situation information. The vibration-related situation information may be an element that needs vibration output. For example, the vibration-related situation information may be a predetermined event, a predetermined state, and/or a predetermined situation. According to various embodiments, the vibration-related situation information may be functions provided by an application, an external electronic device, and an electronic device. According to various embodiments, vibration-related situation information may include at least one from among whether at least one predetermined application executed by an electronic device is performed, whether a predetermined function provided by at least one application is executed, whether at least one external electronic device is connected to the electronic device, whether at least one function of a connected predetermined external electronic device is executed, and whether at least one function provided by the electronic device is executed, or a combination thereof. According to various embodiments, vibration-related situation information may include at least one of a physical form of an electronic device, a posture of an electronic device, and a surrounding environment, or a combination thereof. According to an embodiment, information associated with vibration-related situation information may be information stored in advance in the memory 540. The information associated with the vibration-related situation information according to various embodiments may be received via user input. The information associated with the vibration-related situation information according to various embodiments may be determined by the processor 530.

In operation 1040, the processor 530 may perform mapping between vibration output information and vibration-related situation information. Vibration output information may be an element that may be output as a vibration. For example, vibration output information may include a vibration intensity, a vibration pattern, and a device that is to output a vibration. According to various embodiments, the vibration output information may include a priority order of vibration-related situation information. The processor 530 may identify vibration-related situation information, and may produce vibration mapping information by mapping the identified vibration-related situation information to the vibration output information. According to various embodiments, the processor 530 may perform mapping between a plurality of pieces of vibration-related situation information and a plurality of pieces of vibration output information, as a single piece of vibration mapping information. According to various embodiments, the processor 530 may produce a vibration mapping table including vibration mapping information.

In operation 1050, the processor 530 may store vibration mapping information. For example, the processor 530 may store the vibration mapping table in the memory 540. According to various embodiments, the processor 530 may store, in the memory 540, a vibration mapping table including vibration-related situation information and vibration output information which are mapped to each other. For example, the vibration mapping table may be stored in a database (not illustrated) included in the memory 540. The processor 530 may output a vibration based on the vibration mapping table stored in the memory 540. According to various embodiments, based on the vibration mapping table, the processor 530 may transmit a signal indicating output of a vibration to at least one external electronic device connected to the electronic device 500 via the communication module 510.

Figure 11:
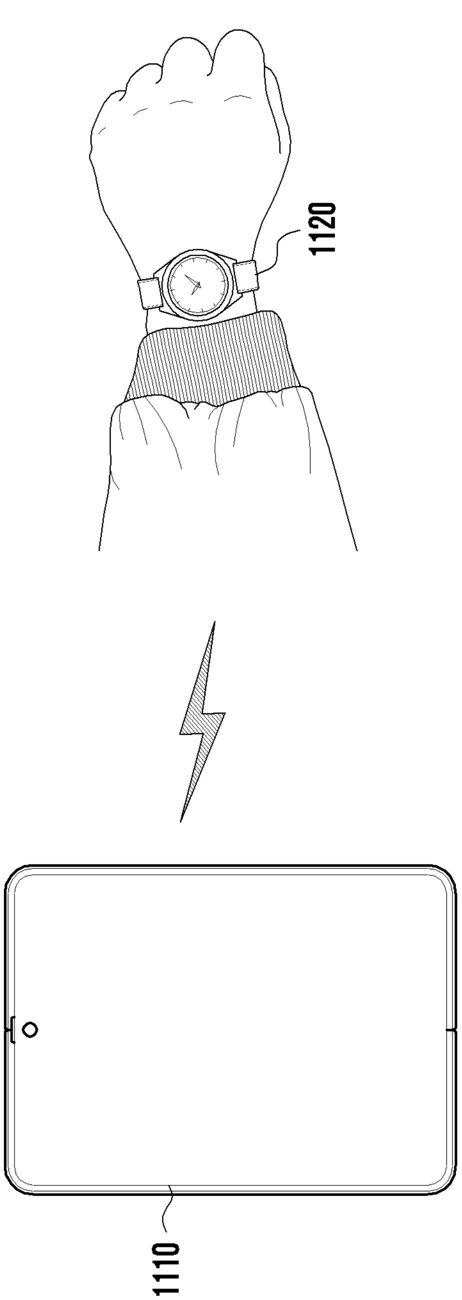
FIG. 11 is a diagram illustrating an operation of controlling vibration output in the case that an external electronic device is connected according to an embodiment of the disclosure.

FIG. 11 is a diagram illustrating an operation of controlling vibration output in the case that an external electronic device is connected according to an embodiment of the disclosure.

Referring to FIG. 11, an electronic device 1110 may connect to a first external electronic device 1120 using short-range wireless communication. In this instance, a processor of the electronic device 1110 may be executing a vibration control manager. The electronic device 1110 may receive vibration function information from a first external electronic device 1120 via connection to the first external electronic device 1120. For example, the electronic device 1110 may receive vibration function information including whether the first external electronic device is capable of outputting a vibration, the range of a vibration intensity capable of being output, and the range of a vibration pattern capable of being output. According to various embodiments, the electronic device 1110 may identify vibration-related situation information, and may determine the vibration-related situation information. According to an embodiment, the vibration-related situation information may include a predetermined function provided by the electronic device 1110, whether the electronic device and a predetermined external electronic device are connected, and whether a predetermined application is executed. According to various embodiments, the electronic device 1110 may produce, based on the received vibration function information, vibration mapping information associated with mapping between vibration-related situation information and vibration output information, and may produce a vibration mapping table including the vibration mapping information. According to various embodiments, the electronic device 1110 may determine vibration output information based on vibration function information, and may perform mapping between the identified vibration-related situation information and the determined vibration output information. According to an embodiment, the vibration-related situation information of the vibration mapping table may be information indicating whether a first external electronic device is connected, and the vibration output information may be information indicating that the first external electronic device is selected as a vibration output device. In this instance, in the case that the vibration-related situation information indicating whether the first external electronic device is connected is satisfied, vibration output may be performed by using the first external electronic device as the vibration output device. In this instance, when receiving a vibration request or a signal that calls vibration output, the electronic device 1110 may transmit a signal for controlling the first external electronic device 1120 so that the first external electronic device outputs vibration output.

Figure 12:
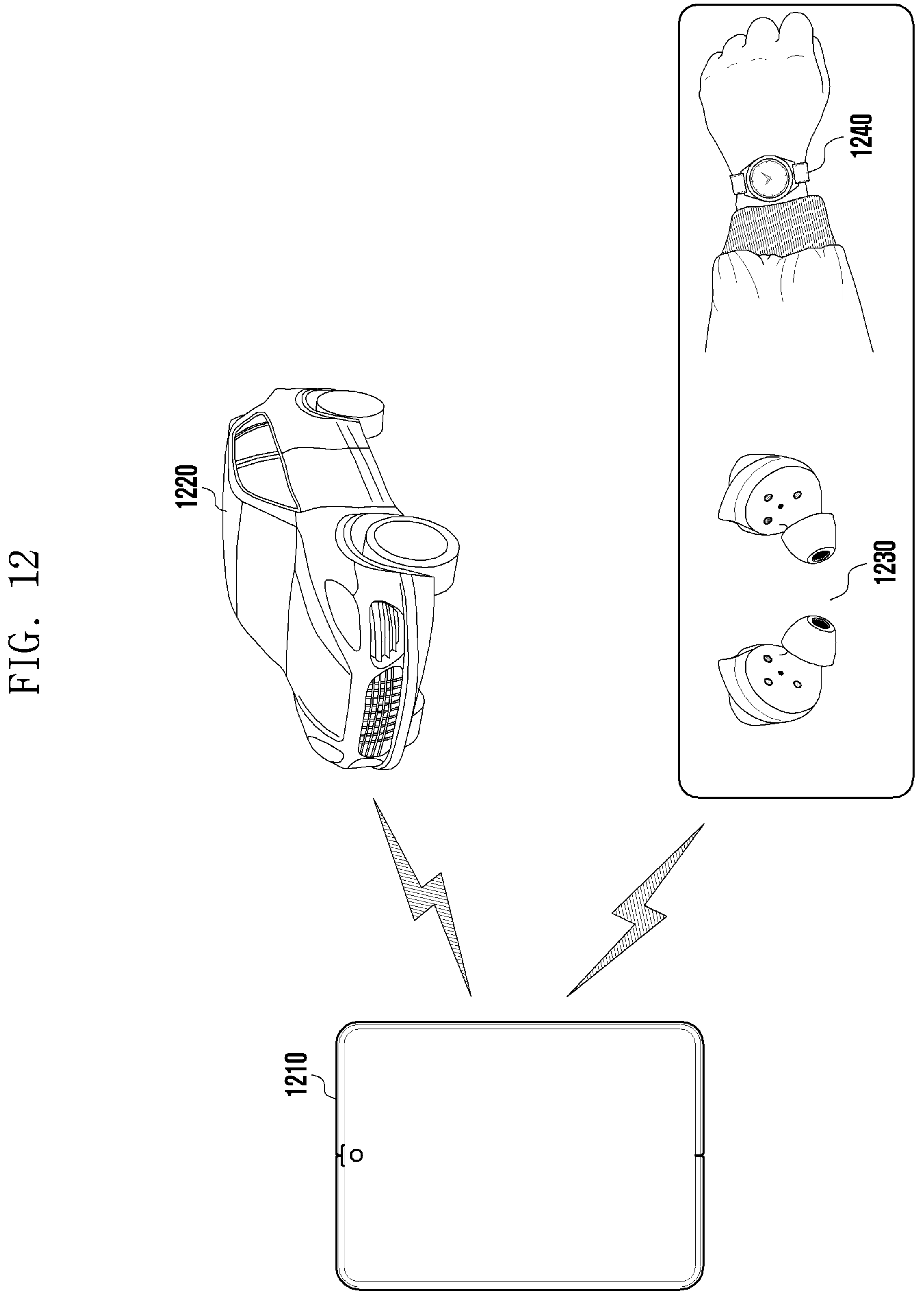
FIG. 12 is a diagram illustrating an operation of controlling vibration output in the case that a plurality of external electronic devices are connected according to an embodiment of the disclosure.

FIG. 12 is a diagram illustrating an operation of controlling vibration output in the case that a plurality of external electronic devices are connected according to an embodiment of the disclosure.

Referring to FIG. 12, an electronic device 1210 may be connected to a second external electronic device 1220 via wired communication or short-range wireless communication. In addition, a first external electronic device 1240 and a fourth external electronic device 1230 may be connected using short-range wireless communication. In this instance, a processor of the electronic device 1210 may be executing a vibration control manager. Via connection to an external electronic device, the electronic device 1210 may receive vibration function information from the first external electronic device 1240, the second external electronic device 1220, and the fourth external electronic device 1230. For example, the electronic device 1210 receive vibration function information including whether each external electronic device is capable of outputting a vibration, the range of a vibration intensity capable of being output, and the range of a vibration pattern capable of being output. According to various embodiments, the electronic device 1210 may identify vibration-related situation information, and may determine the vibration-related situation information. According to an embodiment, the vibration-related situation information may include a predetermined function provided by the electronic device 1210, whether the electronic device and a predetermined external electronic device are connected, and whether a predetermined application is executed. According to various embodiments, based on the received vibration function information, the electronic device 1210 may produce vibration mapping information associated with mapping between vibration-related situation information and vibration output information. According to various embodiments, the electronic device 1210 may determine vibration output information based on vibration function information, and may perform mapping between the identified vibration-related situation information and the determined vibration output information. According to an embodiment, in the case that the second external electronic device 1220 is connected, the second external electronic device 1220 may be a vehicle and a user may be planning to drive the vehicle or may be driving the vehicle. In this instance, the user may need vibration output from a wearable device such as the first external electronic device 1240, rather than from the electronic device 1210. According to an embodiment, vibration-related situation information of vibration mapping information may be information indicating whether the second external electronic device 1220 is connected, and vibration output information may be information indicating that the first external electronic device 1240 and the fourth external electronic device 1230 are selected as vibration output devices. In this instance, in the case that the vibration-related situation information indicating whether the second external electronic device 1220 is connected is satisfied, and the vibration output may be performing using the first external electronic device 1240 and the fourth external electronic device 1230 as vibration output devices. According to various embodiments, whether a predetermined function is executed may be added to vibration-related situation information. In this instance, in the case that function 1 is added to the vibration-related situation information, and only the first external electronic device 1240 is set as a vibration output device and is mapped to the corresponding vibration output information, only the first external electronic device 1240 may operate as a vibration output device if the second external electronic device 1220 is connected and function 1 is executed. In this instance, when receiving a vibration request or a signal that calls vibration output, the electronic device 1210 may transmit a signal for controlling the first external electronic device 1240 so that the first external electronic device 1240 outputs a vibration.

Figure 13:
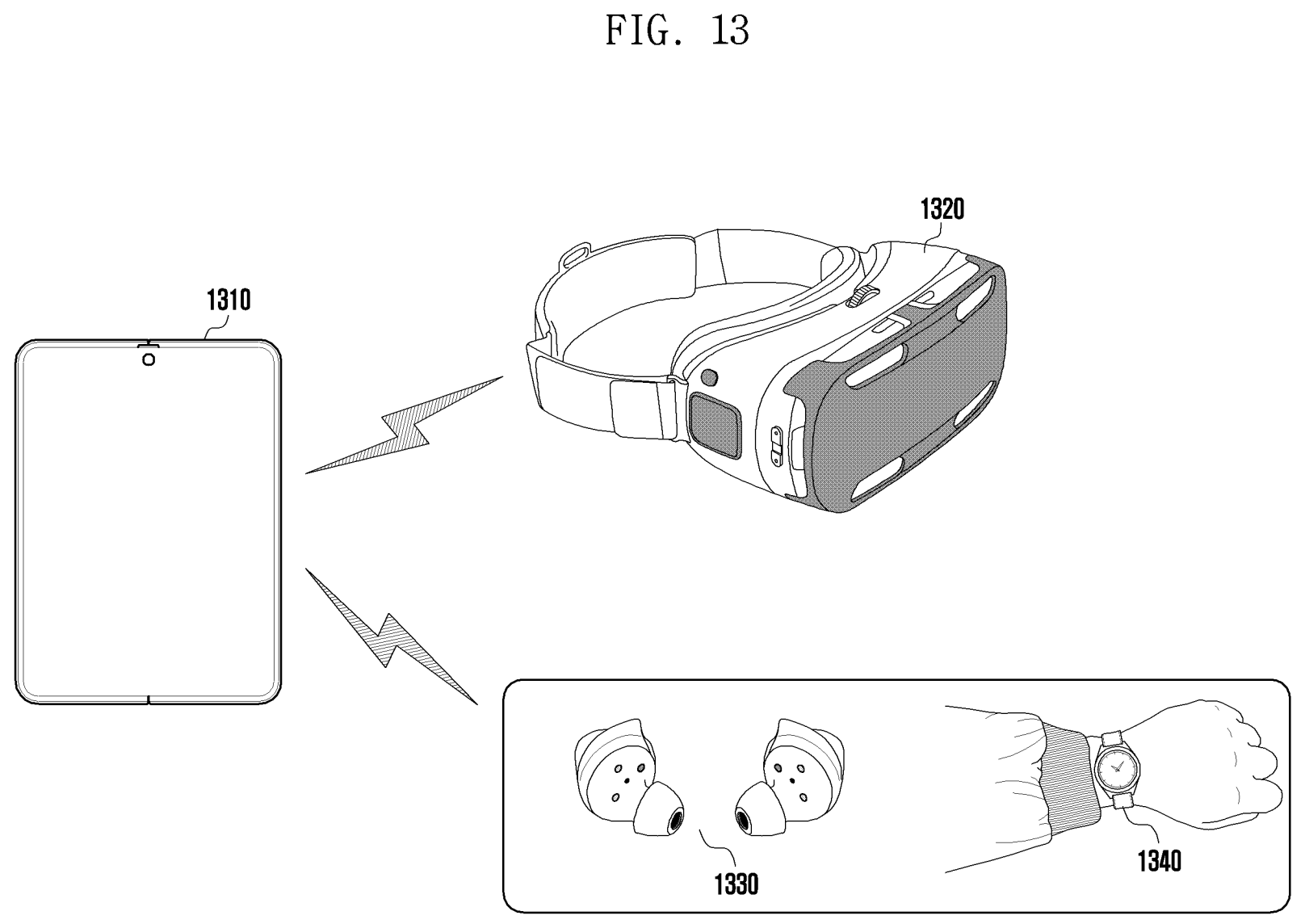

FIG. 13 is a diagram illustrating an operation of controlling vibration output in the case that a plurality of external electronic devices are connected according to an embodiment of the disclosure.

Referring to FIG. 13, an electronic device 1310 may be connected to a third external electronic device 1320 via wired communication or short-range wireless communication. In addition, a first external electronic device 1340 and a fourth external electronic device 1330 may be connected using short-range wireless communication. In this instance, a processor of the electronic device 1310 may be executing a vibration control manager. Via connection to an external electronic device, the electronic device 1310 may receive vibration function information from the first external electronic device 1340, a third external electronic device 1320, and the fourth external electronic device 1330. For example, the electronic device 1310 may receive vibration function information including whether each external electronic device is capable of outputting a vibration, the range of a vibration intensity capable of being output, and the range of a vibration pattern capable of being output. According to various embodiments, the electronic device 1310 may identify vibration-related situation information, and may determine the vibration-related situation information. According to an embodiment, the vibration-related situation information may include a predetermined function provided by the electronic device 1310, whether the electronic device and a predetermined external electronic device are connected, and whether a predetermined application is executed. According to various embodiments, based on the received vibration function information, the electronic device 1310 may produce vibration mapping information associated with mapping between vibration-related situation information and vibration output information. According to various embodiments, the electronic device 1310 may determine vibration output information based on vibration function information, and may perform mapping between the identified vibration-related situation information and the determined vibration output information. According to an embodiment, in the case that the third external electronic device 1320 is connected, the third external electronic device 1320 may be a device that supports a virtual reality (VR) function such as a head mount display (HMD). In this instance, the electronic device 1310 may be performing a third application related to a VR function. In this instance, a user may request the third external electronic device 1320 to output a vibration related to the third application. According to various embodiments, in the case of an application that is not related to a VR function, a user may desire that the electronic device 1310 still outputs a vibration, or the first external electronic device 1340 or the fourth external electronic device 1330 outputs a vibration. According to an embodiment, the vibration-related situation information of vibration mapping information may be information indicating whether the third external electronic device 1320 is connected and the third application is executed, and the vibration output information may be information indicating that the third external electronic device 1320 is selected as a vibration output device. In this instance, in the case that whether the vibration-related situation information indicating whether the third external electronic device 1320 is connected is satisfied, vibration output may be performed by using the third external electronic device 1320 as the vibration output device related to the third application that performs a VR function. According to an embodiment, in the case that a user uses a VR function, the user may place the electronic device 1310 on a predetermined location. In this instance, the user may be difficult to receive a vibration from the electronic device 1310. In this instance, in the case that the vibration-related situation information is set to connection to the third external electronic device 1320, and the vibration output information is set to the first external electronic device 1340 or the fourth external electronic device 1330 which is a wearable device, the connected wearable device may be controlled to output a vibration that the electronic device 1310 has been supposed to output a vibration.

Figure 14:
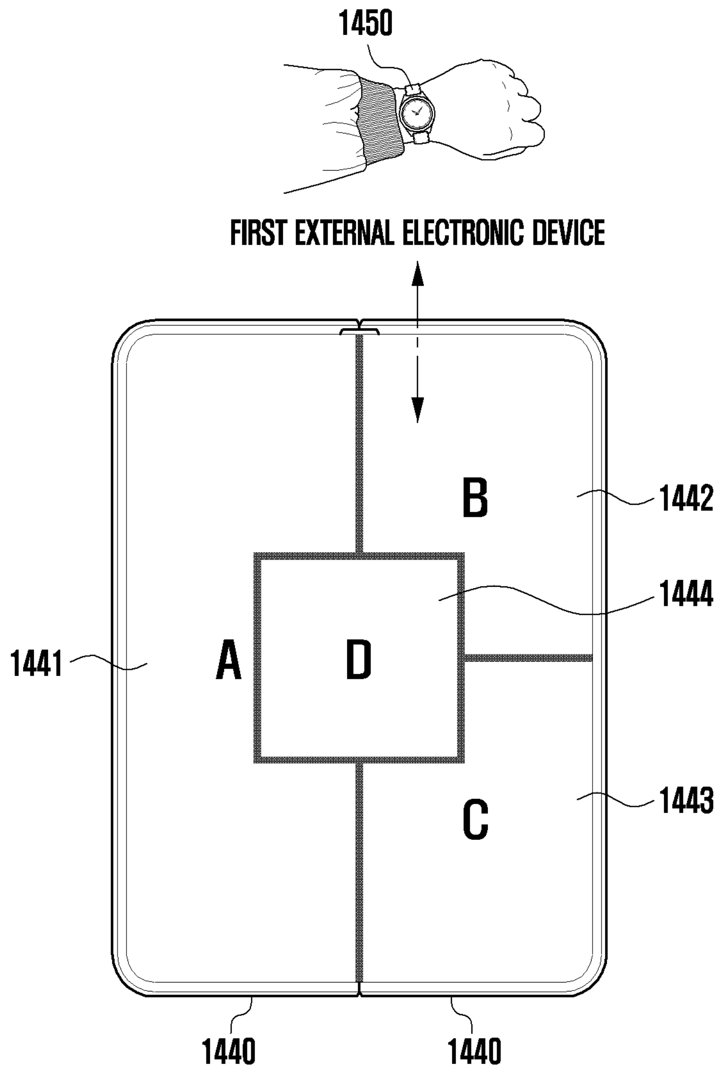
FIG. 14 is a diagram illustrating an operation of controlling vibration output in the case that a plurality of applications are executed according to an embodiment of the disclosure.

FIG. 14 is a diagram illustrating an operation of controlling vibration output in the case that a plurality of applications are executed according to an embodiment of the disclosure.

Referring to FIG. 14, an electronic device 1440 may be executing a plurality of application in parallel. According to various embodiments, the electronic device may perform a first function that is a function of dividing a display into multiple areas and displaying execution screens of different applications on the areas, respectively. For example, the electronic device may divide the display into area A 1441, area B 1442, area C 1443, and area D 1444, may display the execution screen of a first application in the area A 1441, may display the execution screen of a second application in the area B 1442, may display the execution screen of a third application in the area C 1443, and may display the execution screen of a fourth application in the area D 1444. In this instance, a user may prioritize vibration output of the plurality of applications being executed in parallel, or may desire to receive only a vibration of a predetermined application. For example, the user may desire to receive only a vibration of the second application. In this instance, the electronic device 1440 may set vibration-related situation information to execution of the first function and execution of the second application, may select the first external electronic device 1450 as a vibration output device of the vibration output information, and may perform mapping. According to various embodiments, the electronic device 1440 may set a priority order of vibration output information and may perform mapping. For example, in the case that the vibration-related situation information is set to execution of the first function and execution of the second application, a priority order of vibration output information mapped to the corresponding vibration-related situation information may be set as a highest priority order among vibration output information. According to various embodiments, the electronic device 1440 may map vibration output information to be different for each application in order to distinguish vibration output of various application. For example, information indicating whether the first application is executed is selected as vibration-related situation information, pattern 1 is selected among vibration patterns as vibration output information, and mapping is performed. As another example, information indicating whether the third application is executed is selected as vibration-related situation information, pattern 3 is selected among vibration patterns as vibration output information, and mapping is performed.

FIGS. 15A, 15B, 15C, and 15D are diagrams illustrating operations of controlling vibration output in the case that a physical form of an electronic device is modified according to various embodiments of the disclosure.

Figure 15A:
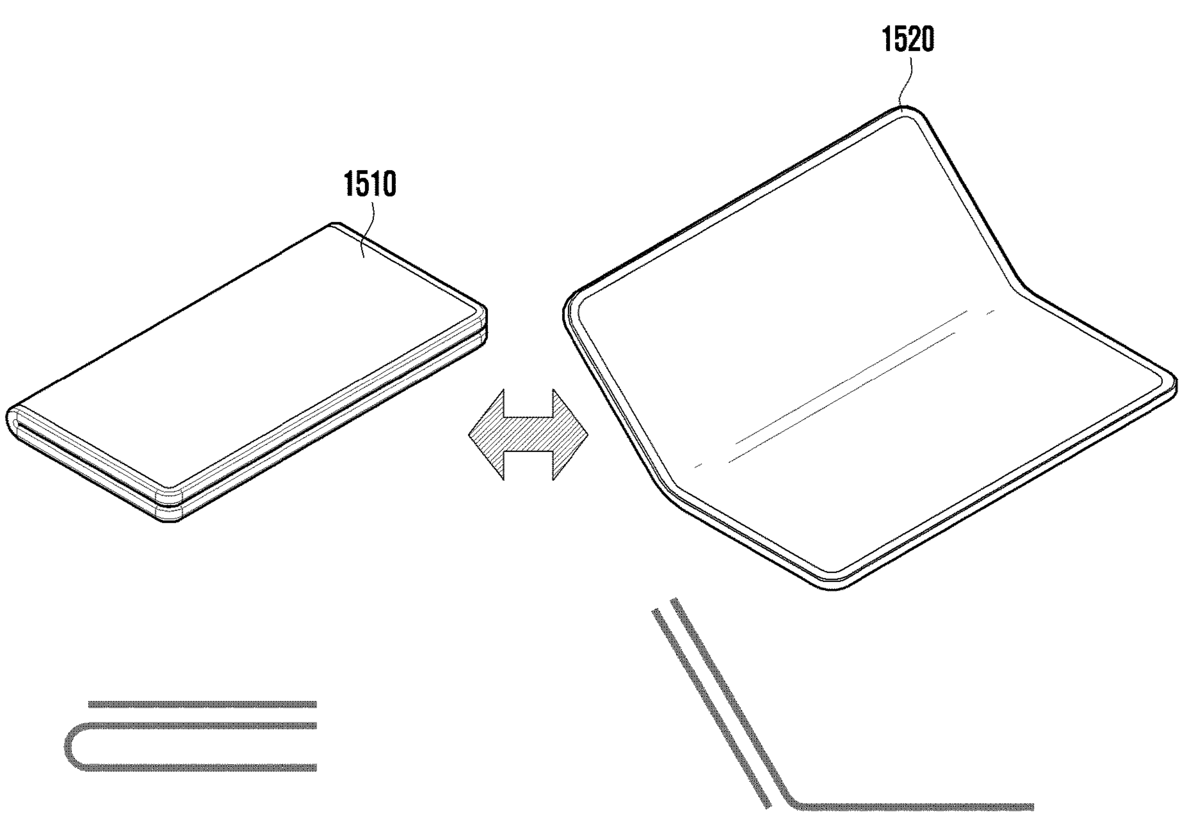
FIGS. 15A, 15B, 15C, and 15D are diagrams illustrating operations of controlling vibration output in the case that a physical form of an electronic device is modified according to various embodiments of the disclosure.

Referring to FIG. 15A, according to an embodiment, in the case that the form of an electronic device is changed from a first form 1510 of FIG. 15A to a second form 1520, the electronic device may be in the state of being modified to a form appropriate for watching a video. In the second form 1520 of FIG. 15A, in the case that an electronic device is executing a video reproduction function and/or an application, a user may be spaced at least a predetermined distance apart from the electronic device and may be in the state of being difficult to receive vibration output, or in the state in which vibration output disturbs the user from viewing a video. Therefore, in this instance, outputting a vibration to another wearable device of the user, or outputting a vibration at a weak intensity, or outputting a vibration in a simple vibration pattern may be an appropriate state. The electronic device selects, for example, a first external electronic device for a vibration output device and selects a low vibration intensity for a vibration intensity, as vibration output information, and may perform mapping the same to vibration-related situation information. According to various embodiments, the second form 1520 may be in the state appropriate for executing a document writing application. According to various embodiments, the electronic device may produce vibration mapping information including, in the vibration-related situation information, an application that is being executed in addition to the form of the electronic device, in order to distinguish a document writing state or a video watching state. The electronic device may be changed to various forms, and forms with various folding angles, in addition to the above-described form, and various forms and/or angles may not be limited to the above-described examples and may be included in the vibration-related situation information.

Figure 15B:
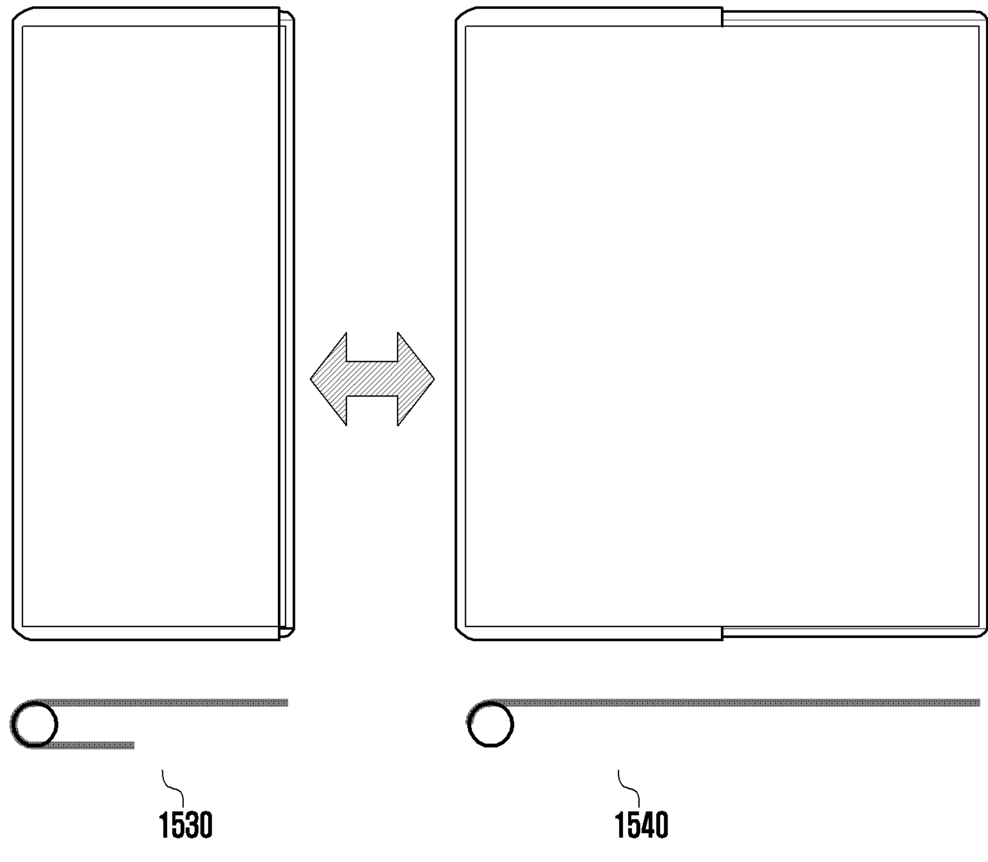

Referring to FIG. 15B, the electronic device may include a rollable and/or slidable structure. According to an embodiment, the size of a screen in a display of the electronic device may be changed according to a change in the form of the electronic device. For example, a rolled (roll in) state or sliding in (slide in) state may be a third form 1530, and a roll out state or sliding out (slide out) state may be a fourth form 1540. In the case that the form of the electronic device is changed from the third form 1530 to the fourth form 1540, a function and/or application appropriate for execution may be different. For example, in the case of changing the form of the electronic device to the fourth form 1540, the state may be appropriate for executing an application that provides a drawing function. According to an embodiment, if the display is changed to the fourth form 1540 and the posture of the electronic device is in the state of being parallel to the ground, this may be the case in which the electronic device is placed on a flat surface such as a table and is being used. In this instance, a user may be difficult to directly sense vibration output from the electronic device. According to various embodiments, vibration mapping information may be produced by selecting the fourth form 1540 as the form of the electronic device and selecting and determining a first posture that is in the state of being parallel to the ground as the posture of the electronic device, among vibration-related situation information, and by selecting a first external electronic device which is a wearable device is selected as a vibration output device for vibration output information. The electronic device may be changed to various forms, and forms with various degrees of roll out state or slide-out state, in addition to the above-described form, and various modified forms and/or degrees of roll out state or slide-out state may not be limited to the above-described examples and may be included in the vibration-related situation information.

Figure 15C:
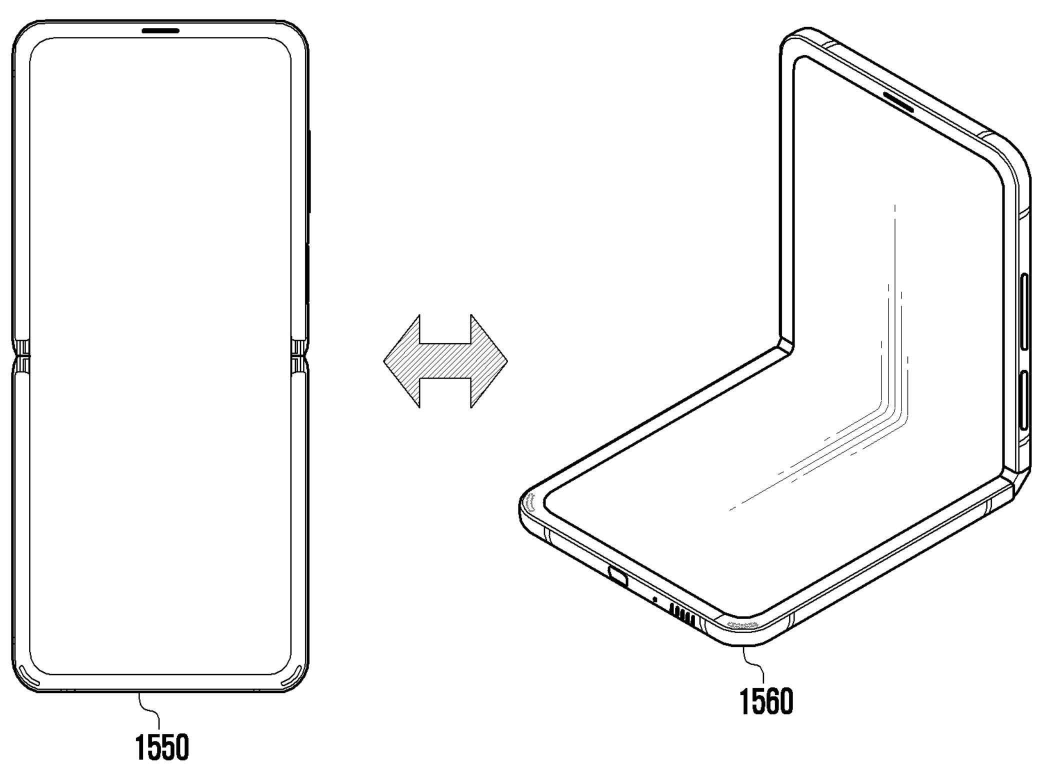

Referring to FIG. 15C, the electronic device may include a fifth form 1550 that is in an unfolded state and a sixth form 1560 that is in a folded state, and the changed form of the electronic device may be vibration-related situation information. For example, the sixth form 1560 is selected as vibration-related situation information, pattern 5 is selected as vibration output information, and mapping therebetween is performed. The electronic device may be changed to various forms and forms with various folding angles, in addition to the above-described form, and various forms and/or angles may not be limited to the above-described examples and may be included in the vibration-related situation information.

Figure 15D:
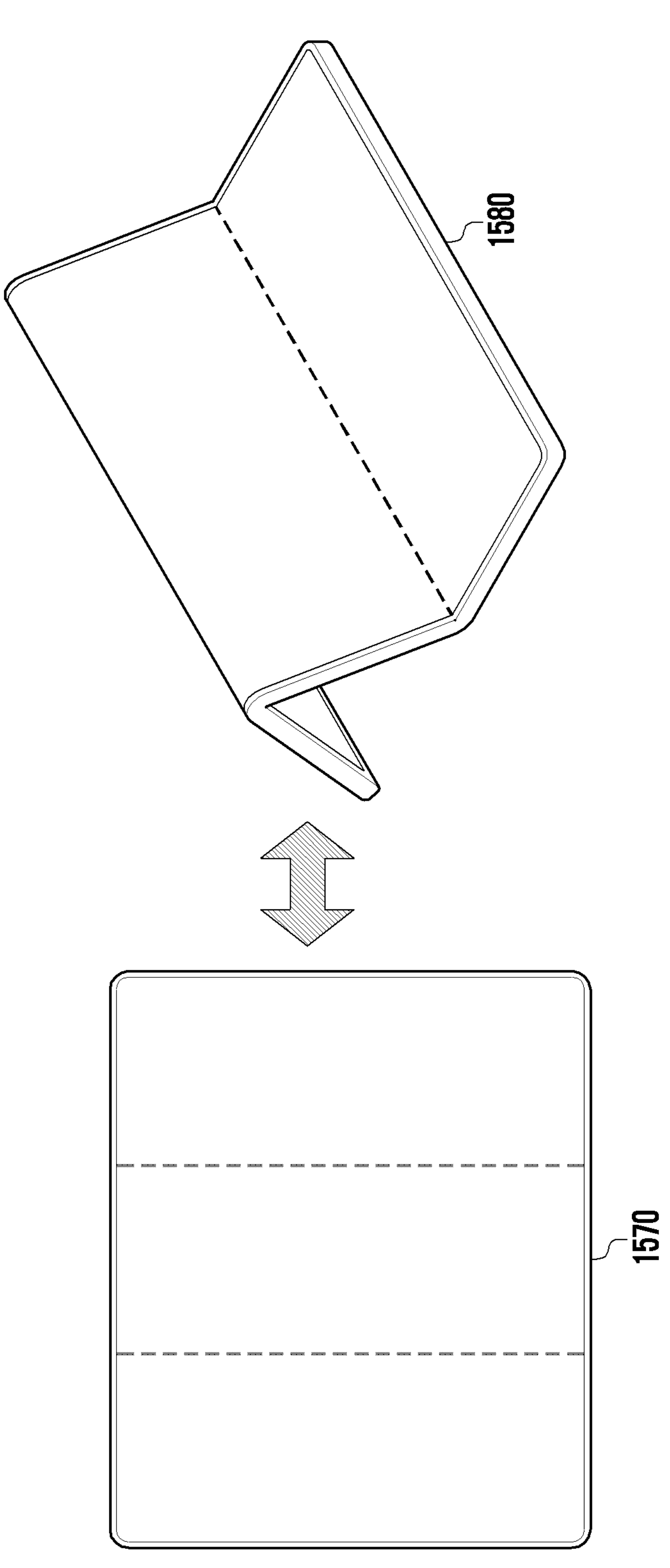

Referring to FIG. 15D, the electronic device may include a seventh form 1570 that is in an unfolded state and an eighth form 1580 that is in a folded state, and the changed form of the electronic device may be vibration-related situation information. For example, the eighth form 1580 is selected as vibration-related situation information, a first external electronic device is selected among vibration output devices as vibration output information, and mapping therebetween is performed. The electronic device may be changed to various forms and forms with various folding angles, in addition to the above-described form, and various forms and/or angles may not be limited to the above-described examples and may be included in the vibration-related situation information.

Figure 16A:
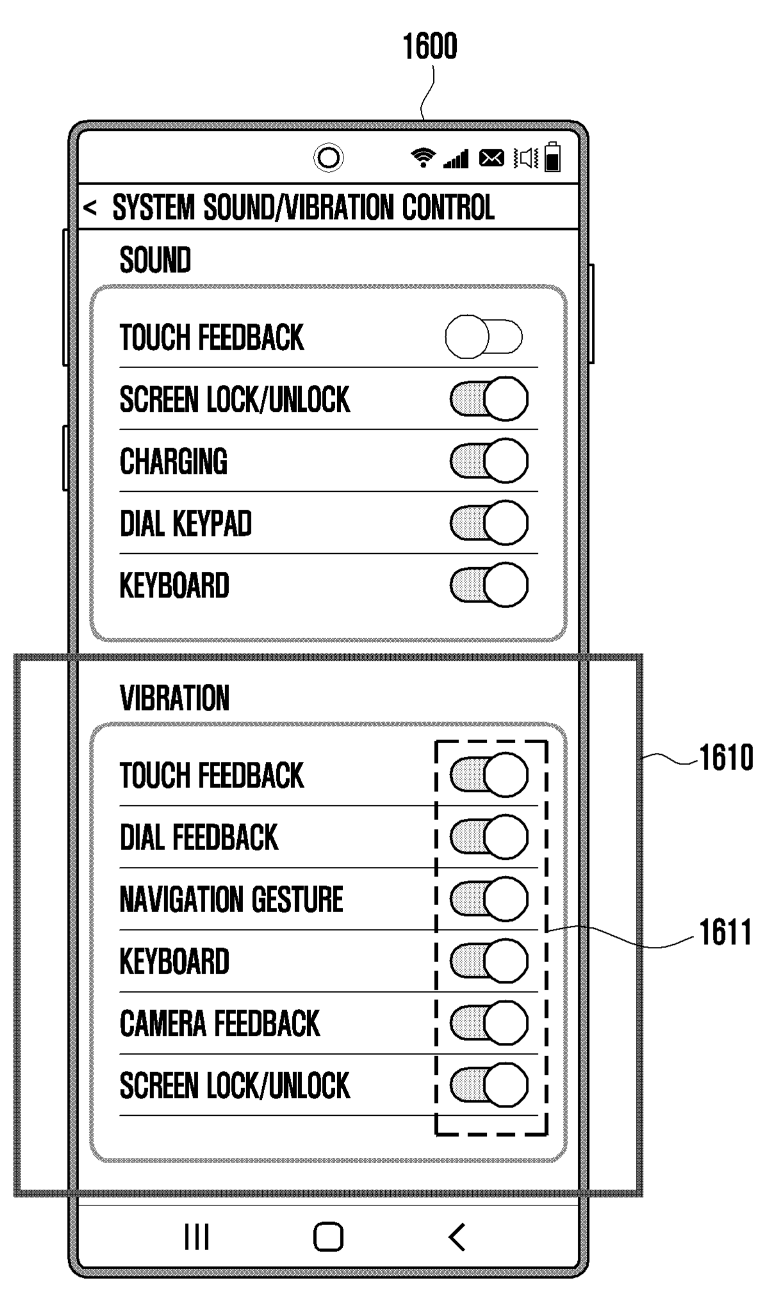

FIG. 16A is a diagram illustrating a vibration control user interface according to an embodiment of the disclosure.

Vibration mapping information according to various embodiments may be understood as a predetermined vibration output mode. For example, the case in which an external electronic device, such as a vehicle, is connected to an electronic device may be understood as a driving mode. As another example, in the case of an electronic device having a display provided in a modifiable form, if the electronic device is changed to a form having a large screen, the posture of the electronic device is detected as being parallel to the ground, and the electronic device is detected as not moving, this may be understood as a table mode. According to various embodiments, a combination of pieces of predetermined vibration-related situation information and/or vibration output information thereof may be set as a predetermined vibration output mode using a predetermined concept word. For example, a touch feedback mode may be understood as vibration mapping information obtained by determining user's touch input to the display as vibration-related situation information and mapping the vibration-related situation information to vibration output information. According to another embodiment, a dial feedback mode may be vibration mapping information obtained by selecting user's dial input to a user interface displaying a dial as vibration-related situation information, and mapping the vibration-related situation information to vibration output information. According to various embodiments, a navigation gesture mode may be vibration mapping information obtained by selecting reception of user's gesture input related to switching of a screen as vibration-related situation information and mapping the vibration-related situation information to vibration output information. According to various embodiments, a keyboard mode may be vibration mapping information obtained by selecting user input to a keyboard application and/or to a user interface that provides keyboard input in a display as vibration-related situation information, and mapping the vibration-related situation information to vibration output information. According to various embodiments, a camera feedback mode may be vibration mapping information obtained by selecting user input to a user interface that receives user input related to a camera function as vibration-related situation information, and mapping the vibration-related situation information to the vibration output information.

Referring to FIG. 16A, an electronic device 1600 according to various embodiments may display a vibration control user interface 1610 that receives user input to enable a user to produce vibration mapping information. For example, the user may directly determine vibration-related situation information and vibration output information, and may perform mapping therebetween so as to produce vibration mapping information. The display may receive user input via the vibration control user interface 1610. According to various embodiments, the electronic device 1600 may receive vibration-related situation information and vibration output information that a user inputs via a vibration control user interface, and may perform mapping between the received vibration output information and vibration mapping information. According to various embodiments, the electronic device may receive, via a user interface, user input that activates/deactivates vibration mapping information of vibration output information and a vibration call stored in advance. For example, the vibration control user interface 1610 may include an input object such as activate/deactivate button 1611, and a user may provide input whether to perform activation/deactivation.

Figure 16B:
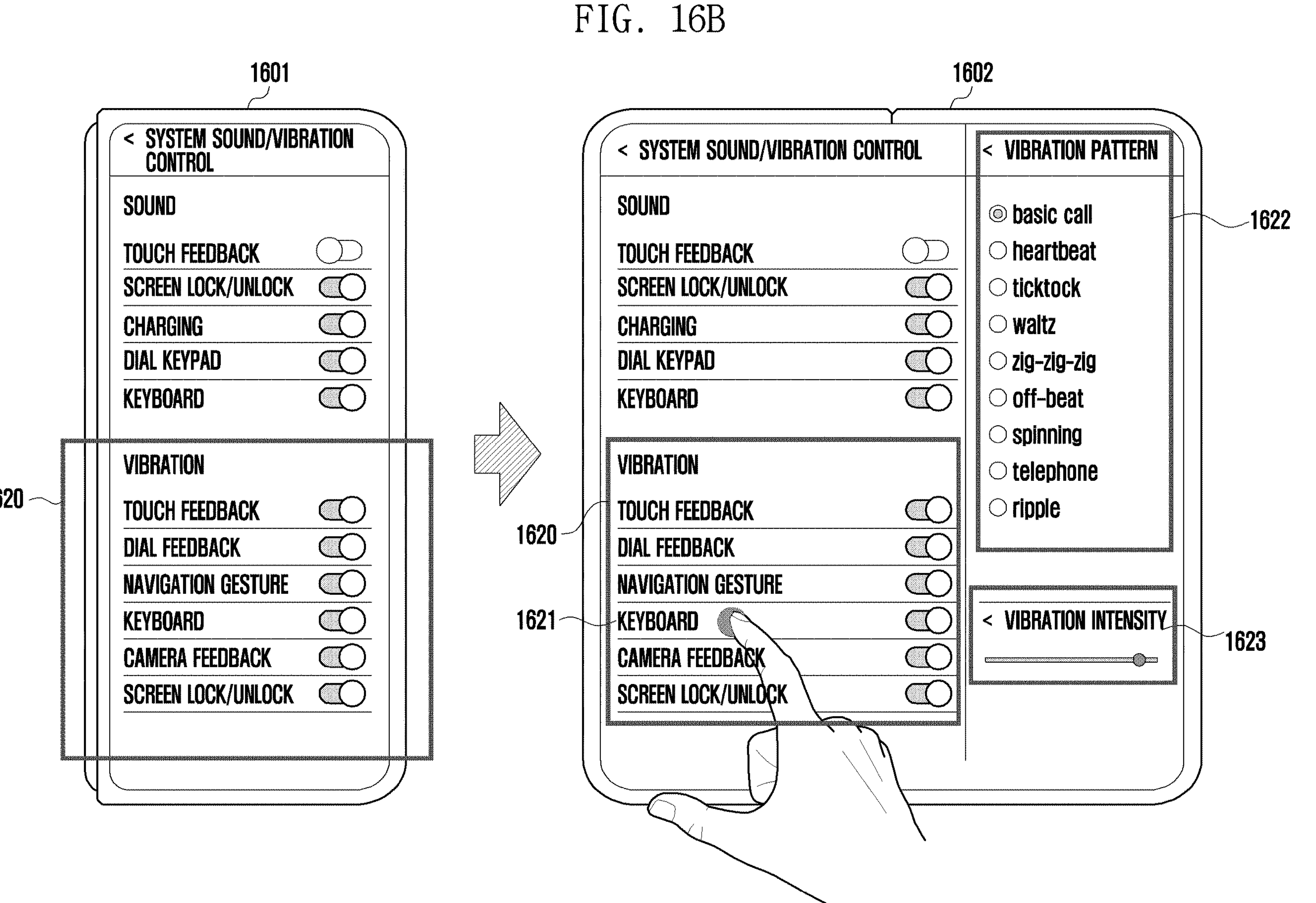

FIG. 16B is a diagram illustrating a vibration control user interface according to an embodiment of the disclosure.

Referring to FIG. 16B, electronic device 1601 and 1602 may correspond to a foldable user equipment (UE). For example, the electronic device 1601 and 1602 may include a structure in which a prepared display is foldable. The form of the electronic device 1601 and 1602 may be modified in response to the folded state of the display. According to various embodiments, the electronic device 1602 in the unfolded state (unfolding) may provide a relatively large area of screen compared to the electronic device 1601 in the folded state (e.g., folding). According to various embodiments, the electronic device 1601 and 1602 may provide a vibration control user interface 1620 for controlling a vibration. For example, the electronic device 1601 and 1602 may display the vibration control user interface 1620 that receives user input to enable a user to produce vibration mapping information. According to various embodiments, in the case of the vibration control user interface 1620, the disposition of component elements of the interface may be changed based on the form of the electronic device. For example, the electronic device 1602 in the unfolded state may simultaneously display a greater number of elements than the electronic device 1601 in the folded state. According to various embodiments, the user may directly determine vibration-related situation information and vibration output information, and may perform mapping therebetween so as to produce vibration mapping information. The display may receive user input via the vibration control user interface 1620. According to various embodiments, the electronic device 1601 and 1602 may receive vibration-related situation information and vibration output information that a user inputs via a vibration control user interface, and may perform mapping between the received vibration output information and vibration mapping information. According to various embodiments, the electronic device may receive user input in association with vibration mapping information stored in advance. For example, the vibration control user interface 1620 may include a button that enables a user to select vibration mapping information stored in advance, and in the case that input for selecting predetermined vibration mapping information is received, the vibration control user interface 1620 may display an input window for receiving, from the user, input for selecting and/or changing a subordinate setting (e.g., a vibration intensity, a vibration pattern) as shown in input windows 1622 and 1623. For example, the vibration control user interface 1620 may display the input window 1622 for selecting a vibration pattern and/or the input window 1623 for selecting a vibration intensity for each piece of vibration mapping information. The user may determine and input a desired vibration pattern to the input window 1622 for changing a vibration pattern, and may produce a new vibration pattern different from a previously stored vibration pattern and may determine the same as a vibration pattern. According to various embodiments, the user may determine and input a desired vibration intensity to the input window 1623 for selecting a vibration intensity. According to various embodiments, the user may change vibration mapping information stored in advance using the vibration control user interface 1620, and may perform mapping new vibration-related situation information and vibration output information and store as new vibration mapping information. For example, referring to FIG. 16B, in the case of selecting a keyboard 1621 among the vibration mapping information, a desired vibration pattern may be selected in the input window 1622 for selecting a vibration pattern and a desired vibration intensity may be selected and input to the input window 1623 for selecting a vibration intensity. In this instance, the vibration pattern and the vibration intensity that a user selects for the vibration-related situation information associated with the use of a keyboard may be mapped as vibration output information.

FIG. 16C is a diagram illustrating a vibration control user interface according to an embodiment of the disclosure.

Referring to FIG. 16C, electronic device 1603 and 1604 may correspond to a rollable/slidable UE. For example, the electronic device 1603 and 1604 may include a structure in which a prepared display is rollable. The form of the electronic device 1603 and 1604 may be modified in response to a rolled state of the display. According to various embodiments, the electronic device 1604 in an unfolded state (e.g., a roll out/slide-out state) may provide a relatively large area of screen compared to the electronic device 1603 in the folded state (e.g., a rolled/slide-in state). According to various embodiments, the electronic device 1603 and 1604 may provide a vibration control user interface 1630 for controlling a vibration. For example, the electronic device 1603 and 1604 may display, in the display, the vibration control user interface 1630 that receives user input to enable a user to produce vibration mapping information. According to various embodiments, in the case of the vibration control user interface 1630, the disposition of component elements of the interface may be changed based on the form of the electronic device. For example, the electronic device 1604 in the unfolded state may simultaneously display a greater number of elements than the electronic device 1603 in the folded state. According to various embodiments, the user may directly determine vibration-related situation information and vibration output information, and may perform mapping therebetween so as to produce vibration mapping information. The display may receive user input via the vibration control user interface 1630. According to various embodiments, the electronic device 1603 and 1604 may receive vibration-related situation information and vibration output information that the user inputs via a vibration control user interface, and may perform mapping between the received vibration output information and vibration mapping information. According to various embodiments, the electronic device may receive, from the user, a change associated with vibration mapping information stored in advance. For example, the vibration control user interface 1630 may include a button that enables the user to select vibration mapping information stored in advance, and in the case that input for selecting predetermined vibration mapping information is received, the vibration control user interface 1630 may display an input window for receiving input for selecting a subordinate setting as shown in input windows 1632, 1633, and 1634. For example, the vibration control user interface 1630 may display the input window 1632 for selecting a vibration pattern, the input window 1633 for selecting a vibration intensity, and/or the input window 1634 for producing a vibration pattern for each piece of vibration mapping information. The user may determine and input a desired vibration pattern to the input window 1632 for selecting a vibration pattern. According to various embodiments, the user may produce, using the vibration control user interface 1630, a new vibration pattern that is different from a predetermined vibration pattern and may determine the same as a vibration pattern. For example, the electronic device 1603 and 1604 may include a vibration pattern production input window 1634 (e.g., user vibration setting) that enables a user to directly produce a new vibration pattern. According to various embodiments, the user may determine and input a desired vibration intensity to the input window 1634 for changing a vibration intensity. According to various embodiments, the user may change vibration mapping information stored in advance using the vibration control user interface 1630, and may perform mapping between new vibration-related situation information and vibration output information and store the same as new vibration mapping information. For example, referring to FIG. 16C, in the case of selecting camera feedback 1631 among the vibration mapping information, a desired vibration pattern may be selected in the input window 1632 for selecting a vibration pattern and a desired vibration intensity may be selected and input to the input window 1633 for selecting a vibration intensity. In this instance, the vibration pattern and the vibration intensity that a user selects for vibration-related situation information associated with operations or input performed when a camera function is used, may be mapped as vibration output information.

Figure 16D:
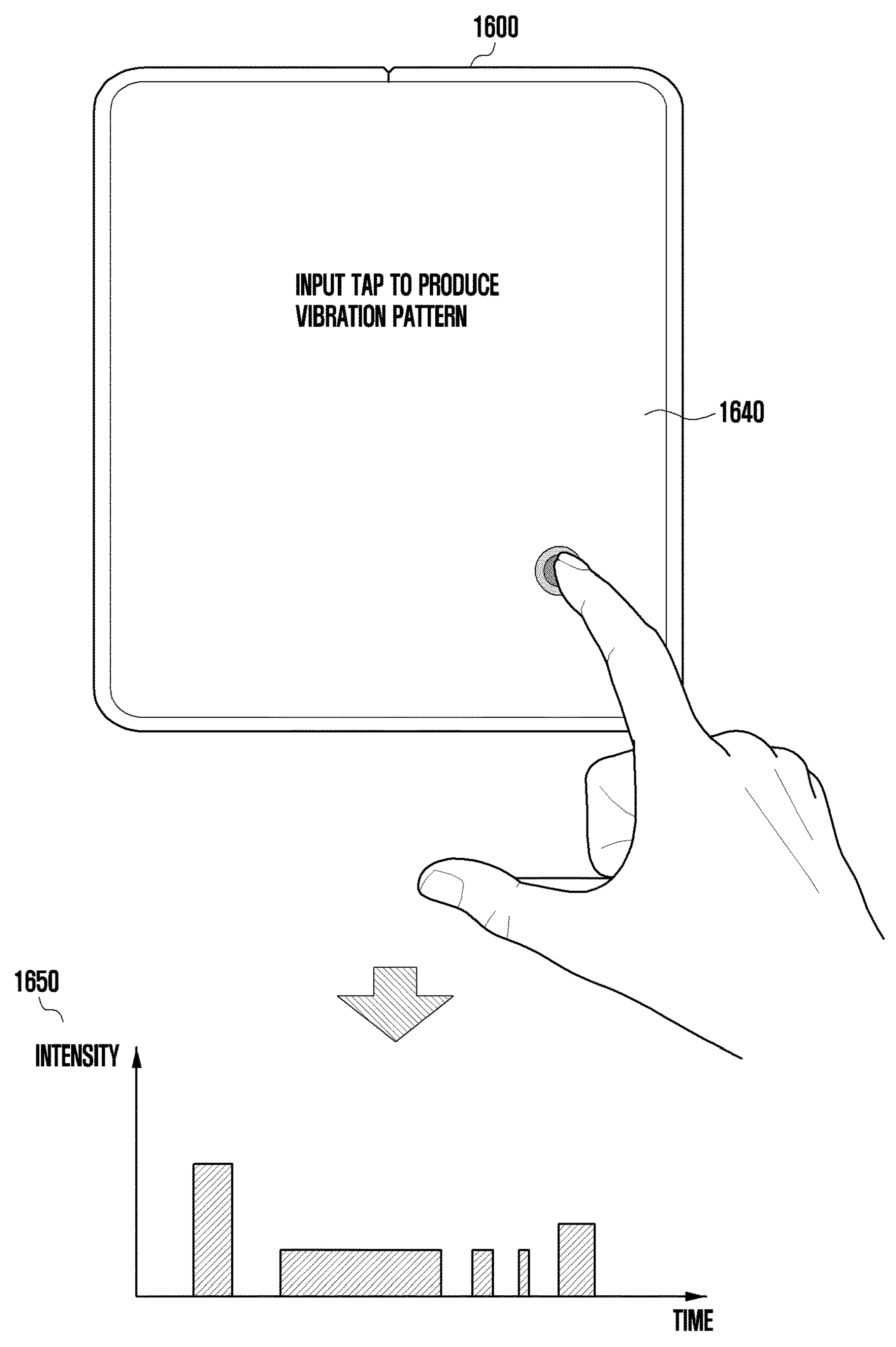

FIG. 16D is a diagram illustrating a vibration control user interface according to an embodiment of the disclosure.

According to various embodiments, a vibration control user interface may display an input window 1640 for receiving input associated with a new vibration pattern that is input and produced by a user. As input of the new vibration pattern, user's touch input may be received in the display of the electronic device 1600. The display may receive input of a user touch. According to various embodiments, the display may identify at least one of a pressure of a user touch, an area of a user touch, and a duration of a user touch. For example, the display may include a touch sensor configured to sense a touch, or a pressure sensor configured to measure the intensity of force given by the touch. According to various embodiments, a vibration control user interface may receive user's touch input via a display, and may produce a new vibration pattern based thereon. For example, vibration pattern information may be produced by converting the user touch pressure and/or touch area into information corresponding to a vibration intensity, converting the duration in which the user holds a touch into a vibration duration time, and converting a time interval between user touches into a time interval between vibrations.

Referring to FIG. 16D, the electronic device may receive a user touch input via the vibration control user interface 1640, may produce a vibration pattern based thereon, and this may be understood as a graph 1650 including time and vibration intensity. For example, a vibration pattern produced based on user's touch input may be understood as the visual graph 1650 including a vibration intensity, a duration time, and a time interval. An electronic device according to various embodiments disclosed in the document may include a display, a communication module, a memory, and a processor, wherein the processor is configured to receive a vibration output request, to detect vibration-related situation information, and to generate vibration output information corresponding to the detected vibration-related situation information, wherein the vibration-related situation information includes at least one from among information associated with at least one external electronic device connected to the electronic device, whether a predetermined application is executed, and whether a predetermined function of the electronic device is executed, and wherein the vibration output information includes at least one from among a vibration intensity, a vibration pattern, output device selection information, and a priority order of vibration-related situation information.

In addition, the processor may be configured to produce a vibration mapping table including vibration mapping information associated with mapping between the vibration-related situation information and the vibration output information.

In addition, the processor may output a vibration based on the vibration output information.

In addition, the vibration-related situation information may include whether a first external electronic device is connected, and the processor may be configured to generate vibration output information including output device selection information that selects the first external electronic device as an output device.

In addition, when a haptic output request signal is received, the processor may transmit, to the selected first external electronic device, a signal indicating output of a vibration.

In addition, the vibration-related situation information may include whether a first external electronic device is connected and whether a second external electronic device is connected, and the processor may be configured to generate vibration output information including output device selection information that selects the first external electronic device as an output device.

In addition, the vibration-related situation information may include whether a third external electronic device is connected and whether a third application is executed, and the processor may be configured to generate vibration output information including output device selection information that selects the third external electronic device as an output device.

In addition, the vibration-related situation information may include whether a first application is executed and whether a first function that simultaneously performs a plurality of applications is executed, the vibration output information further includes a priority order of vibration output of the predetermined application, and when a plurality of applications including the first application are executed, the processor may be configured to generate vibration output information including information that selects a priority order of vibration output of the first application as a highest priority order.

In addition, the vibration-related situation information may further include a form of the electronic device and a posture of the electronic device.

In addition, the processor may be configured to display the vibration-related situation information and the vibration output information, and to display a user interface that receives input for selecting the vibration-related situation information and the vibration output information in the display, and to produce vibration mapping information associated with mapping between the selected vibration-related situation information and the selected vibration output information.

In addition, when an external electronic device is connected, the processor may receive vibration function information from the external electronic device, and the vibration function information may include at least one of whether a vibration is capable of being output, an intensity of a vibration that the external electronic device is capable of outputting, and a vibration pattern.

A method of controlling vibration output by an electronic device according to various embodiments disclosed in the document may include an operation of receiving a vibration output request, an operation of detecting vibration-related situation information, and an operation of generating vibration output information corresponding to the detected vibration-related situation information, wherein the vibration-related situation information includes at least one from among information associated with at least one external electronic device connected to the electronic device, whether a predetermined application is executed, and whether a predetermined function of the electronic device is executed, and wherein the vibration output information includes at least one of a vibration intensity, a vibration pattern, output device selection information, and a priority order of vibration-related situation information.

In addition, the method may further include an operation of producing a vibration mapping table including vibration mapping information associated with mapping between the vibration-related situation information and the vibration output information.

In addition, the method may further include an operation of outputting a vibration based on the vibration output information.

In addition, the vibration-related situation information may include whether a first external electronic device is connected, and the operation of generating the vibration output information may include an operation of generating vibration output information including output device selection information that selects the first external electronic device as an output device.

In addition, the method may further include an operation of transmitting, to the selected first external electronic device, a signal indicating output of a vibration when a haptic output request signal is received.

In addition, the vibration-related situation information may include whether a first external electronic device is connected and a second external electronic device is connected, and the operation of generating the vibration output information may include generating vibration output information including output device selection information that selects the first external electronic device.

In addition, the vibration-related situation information may include whether a third external electronic device is connected and whether a third application is executed, and the operation of generating the vibration output information may include an operation of generating vibration output information including output device selection information that selects the third external electronic device as an output device.

In addition, the vibration-related situation information may include whether a first application is executed and whether a first function that simultaneously performs a plurality of applications is executed, the vibration output information may further include a priority order of vibration output of the predetermined application, and the operation of generating the vibration output information may include an operation of generating vibration output information including information that selects a priority order of vibration output of the first application as a highest priority order when the plurality of applications including the first application are executed.

In addition, the method may further include an operation of receiving vibration function information from an external electronic device when the external electronic device is connected, and the vibration function information may include at least one from among whether a vibration is capable of being output, an intensity of a vibration that the external electronic device is capable of outputting, and a vibration pattern.

An electronic device according to various embodiments may be one of the various types of devices. The electronic device may include, for example, a portable communication device (e.g., a smartphone), a computer device, a portable multimedia device, a portable medical device, a camera, a wearable device, or home appliances. The electronic device according to an embodiment of the disclosure is not limited to the above-described devices.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

a communication module;

memory storing instructions and including one or more storage mediums; and at least one processor comprising processing circuitry, wherein the instructions, when individually or collectively executed by the at least one processor, cause the electronic device to:

receive a vibration output request, detect vibration-related situation information, and generate vibration output information corresponding to the detected vibration-related situation information, wherein the vibration-related situation information comprises at least one from among whether at least one external electronic device is connected to the electronic device, whether at least one function of a connected predetermined external electronic device is executed, a change in a form of the electronic device, a posture of the electronic device, and a surrounding environment of the electronic device, and wherein the vibration output information comprises a vibration intensity, a vibration pattern, output device selection information, and a priority order of vibration-related situation information.

2. The electronic device of claim 1, wherein the instructions, when individually or collectively executed by the at least one processor, cause the electronic device to:

map the vibration-related situation information to the vibration output information to generate a vibration mapping table.

3. The electronic device of claim 1, wherein the instructions, when individually or collectively executed by the at least one processor, cause the electronic device to:

output a vibration based on the vibration output information.

4. The electronic device of claim 1, wherein the vibration-related situation information comprises whether a first external electronic device is connected, and wherein the instructions, when individually or collectively executed by the at least one processor, further cause the electronic device to:

generate vibration output information including output device selection information that selects the first external electronic device as an output device.

5. The electronic device of claim 4, wherein the instructions, when individually or collectively executed by the at least one processor, further cause the electronic device to:

in case that a haptic output request signal is received, transmit, to the selected first external electronic device, a signal indicating output of a vibration.

6. The electronic device of claim 1, wherein the vibration-related situation information comprises whether a first external electronic device is connected and whether a second external electronic device is connected, and wherein the instructions, when individually or collectively executed by the at least one processor, further cause the electronic device to:

generate vibration output information including output device selection information that selects the first external electronic device as an output device.

7. The electronic device of claim 1, wherein the vibration-related situation information comprises whether a third external electronic device is connected and whether a third application is executed, and wherein the instructions, when individually or collectively executed by the at least one processor, further cause the electronic device to:

generate vibration output information including output device selection information that selects the third external electronic device as an output device.

8. The electronic device of claim 1, wherein the vibration-related situation information comprises whether a first application is executed and whether a first function that simultaneously performs a plurality of applications is executed, wherein the vibration output information further comprises a priority order of vibration output of a predetermined application, and wherein, in case that a plurality of applications including the first application are executed, the instructions, when individually or collectively executed by the at least one processor, further cause the electronic device to:

generate vibration output information including information that selects a priority order of vibration output of the first application as a highest priority order.

9. The electronic device of claim 1, wherein the vibration-related situation information further comprises a form of the electronic device and a posture of the electronic device.

10. The electronic device of claim 1, wherein the instructions, when individually or collectively executed by the at least one processor, further cause the electronic device to:

display the vibration-related situation information and the vibration output information, and to display a user interface that receives input for selecting the vibration-related situation information and the vibration output information in the display, and produce vibration mapping information associated with mapping between the selected vibration-related situation information and the selected vibration output information.

11. The electronic device of claim 1, wherein the instructions, when individually or collectively executed by the at least one processor, further cause the electronic device to:

in case that an external electronic device is connected, receive vibration function information from the external electronic device, and wherein the vibration function information comprises at least one of whether a vibration is capable of being output, an intensity of a vibration that the external electronic device is capable of outputting, and a vibration pattern.

12. A method of controlling vibration output by an electronic device, the method comprising:

receiving a vibration output request;

detecting vibration-related situation information; and generating vibration output information corresponding to the detected vibration-related situation information, wherein the vibration-related situation information comprises at least one from among whether at least one external electronic device is connected to the electronic device, whether at least one function of a connected predetermined external electronic device is executed, a change in a form of the electronic device, a posture of the electronic device, and a surrounding environment of the electronic device, and wherein the vibration output information comprises a vibration intensity, a vibration pattern, output device selection information, and a priority order of vibration-related situation information.

13. The method of claim 12, further comprising:

mapping the vibration-related situation information to the vibration output information to generate a vibration mapping table.

14. The method of claim 12, further comprising:

outputting a vibration based on the vibration output information.

15. The method of claim 12, wherein the vibration-related situation information comprises whether a first external electronic device is connected, and wherein the generating of the vibration output information comprises generating vibration output information including output device selection information that selects the first external electronic device as an output device.

* * * * *